United States Patent
Momose

(10) Patent No.: US 10,429,221 B2
(45) Date of Patent: Oct. 1, 2019

(54) ELECTROMAGNETIC FLOWMETER

(71) Applicant: AZBIL CORPORATION, Chiyoda-ku (JP)

(72) Inventor: Osamu Momose, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 133 days.

(21) Appl. No.: 15/806,903

(22) Filed: Nov. 8, 2017

(65) Prior Publication Data

US 2018/0128664 A1    May 10, 2018

(30) Foreign Application Priority Data

Nov. 9, 2016 (JP) .................. 2016-218712

(51) Int. Cl.
*G01F 1/58* (2006.01)
*G01F 1/60* (2006.01)

(52) U.S. Cl.
CPC .............. *G01F 1/588* (2013.01); *G01F 1/584* (2013.01); *G01F 1/60* (2013.01)

(58) Field of Classification Search
None
See application file for complete search history.

(56) References Cited

U.S. PATENT DOCUMENTS 5,691,484 A * 11/1997 Feller .................. G01F 1/584
73/861.13

FOREIGN PATENT DOCUMENTS

| JP | 5-172600 | 7/1993 |
|----|----------|--------|
| JP | 2004-226394 | 8/2004 |
| JP | 2014-202662 | 10/2014 |

* cited by examiner

*Primary Examiner* — Harshad R Patel
(74) *Attorney, Agent, or Firm* — Oblon, McClelland, Maier & Neustadt, L.L.P.

(57) ABSTRACT

An electromagnetic flowmeter includes a board having a preamplifier circuit and a shield case mounted thereon. The preamplifier circuit amplifies an electromotive force generated between first and second electrodes disposed to be perpendicular to a magnetic field generated by an exciting coil on a measurement pipe. The preamplifier circuit includes first and second operational amplifiers, a first wiring connecting the first electrode and a non-inverting input terminal of the first operational amplifier, a second wiring connecting the second electrode and a non-inverting input terminal of the second operational amplifier, a first resistor connecting an output terminal and an inverting input terminal of the first operational amplifier, a second resistor connecting an output terminal and an inverting input terminal of the second operational amplifier, and a third resistor connecting the inverting terminals of the first and second operational amplifiers.

12 Claims, 22 Drawing Sheets

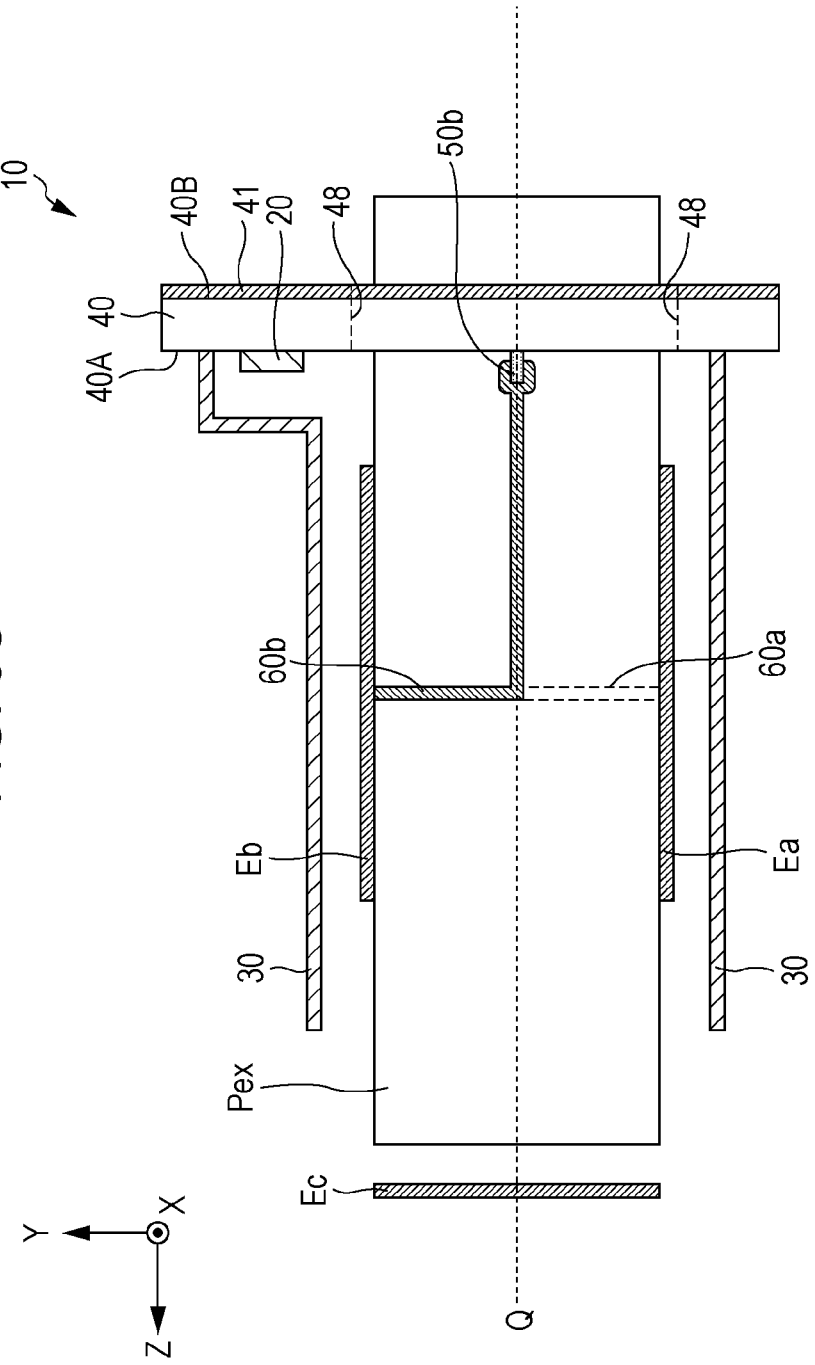

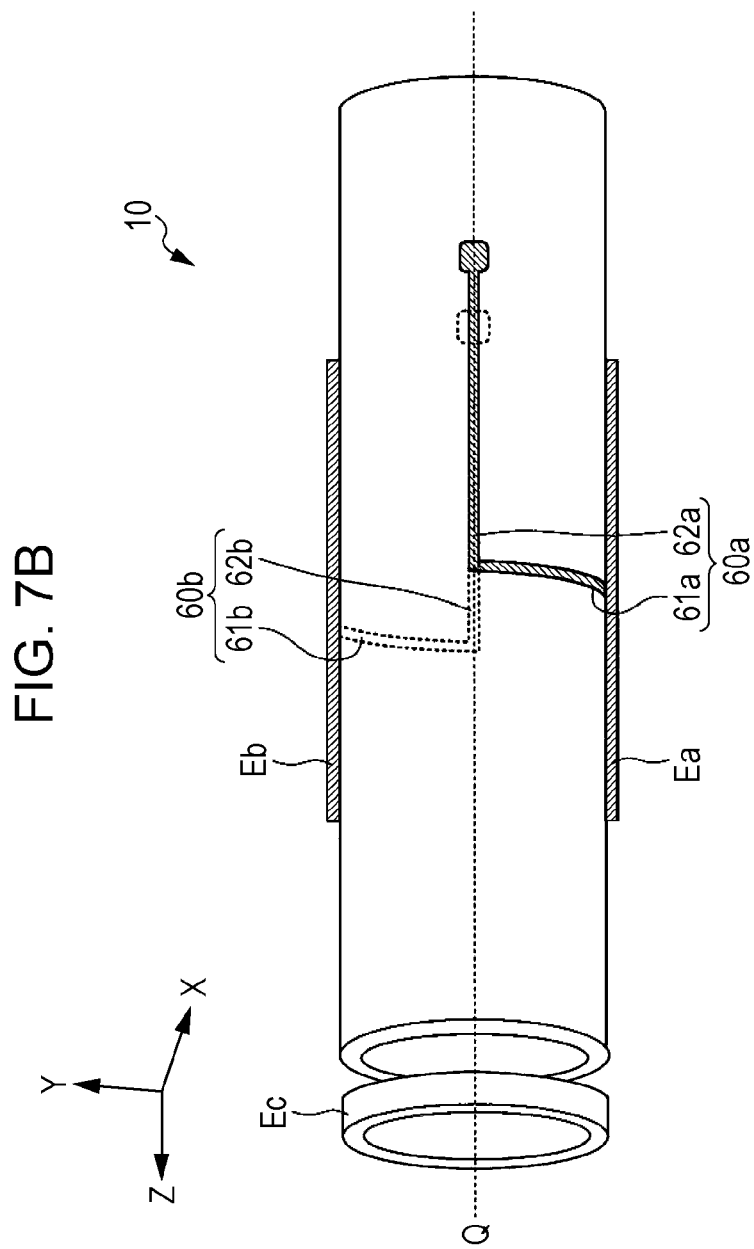

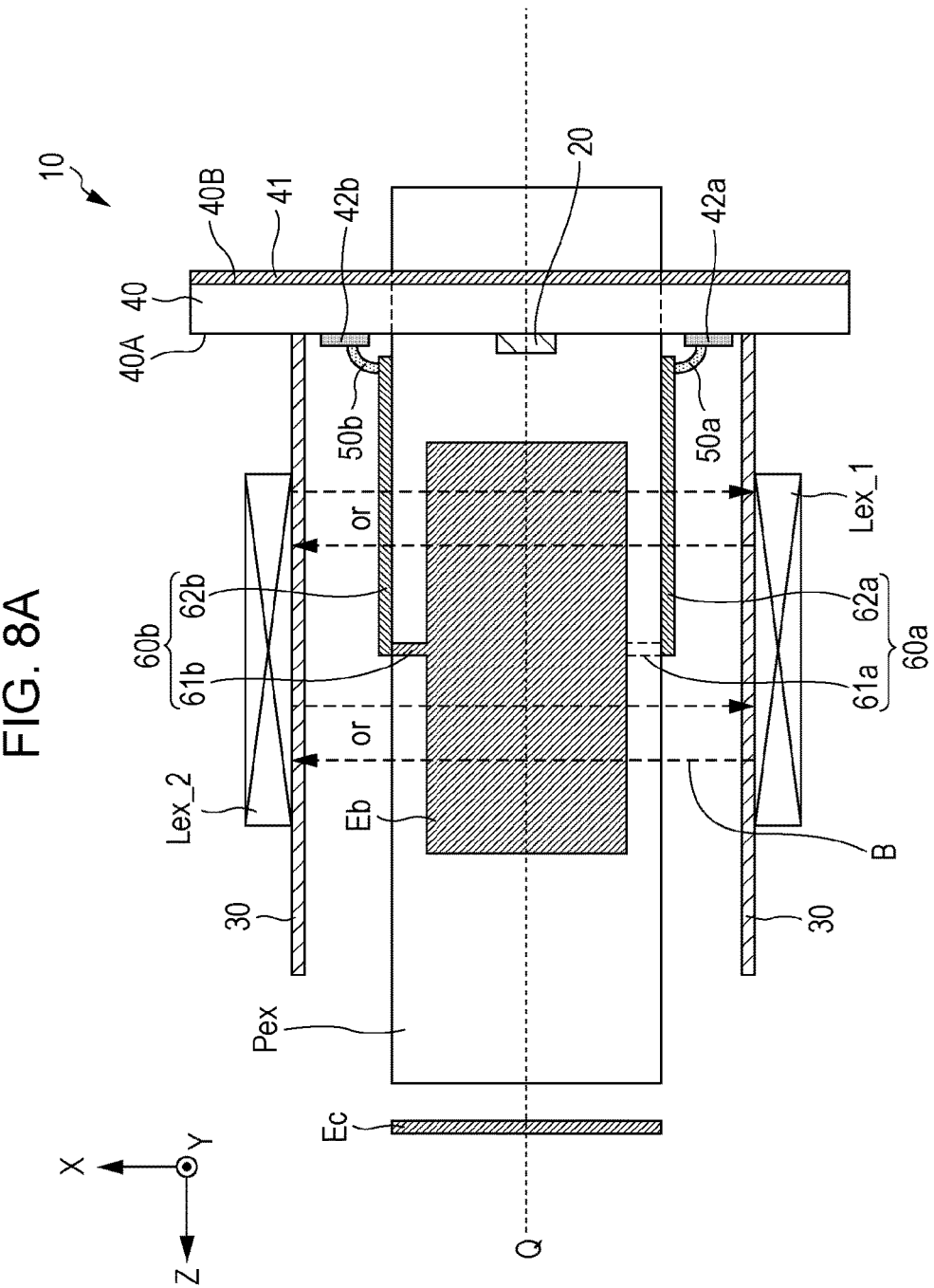

ELECTROMAGNETIC FLOWMETER

CROSS-REFERENCE TO RELATED APPLICATIONS

The present application is based on and claims priority to Japanese Application No. 2016-218712, filed Nov. 9, 2016, the entire contents of which are incorporated herein by reference.

BACKGROUND

Field

The present disclosure relates to an electromagnetic flowmeter that measures a flow rate of a fluid in various process systems and, more particularly, to a capacitance-type electromagnetic flowmeter.

Description of the Related Art

An electromagnetic flowmeter includes an exciting coil and a pair of electrodes. The exciting coil generates a magnetic field in a direction perpendicular to a direction in which a fluid flows in a measurement pipe. The pair of electrodes is disposed at the measurement pipe in a direction perpendicular to the magnetic field generated by the exciting coil. Such an electromagnetic flowmeter is a measurement instrument that measures a flow rate of a detection-target fluid that flows in the measurement pipe by detecting an electromotive force generated between the electrodes while alternately switching the polarity of an exciting current flowing through the exciting coil.

Electromagnetic flowmeters are generally categorized into fluid-contact-type electromagnetic flowmeters and capacitance-type (non-fluid-contact-type) electromagnetic flowmeters. In the fluid-contact-type electromagnetic flowmeters, the electrodes disposed at the measurement pipe are brought into direct contact with a measurement-target fluid to detect an electromotive force generated by the measurement-target fluid. In the capacitance-type electromagnetic flowmeters, instead of bringing the electrodes disposed at the measurement pipe to be in contact with a measurement-target fluid, an electromotive force generated by the measurement-target fluid is detected based on capacitances formed between the measurement-target fluid and the electrodes.

In capacitance-type electromagnetic flowmeters, an electromotive force generated between the electrodes is amplified by a signal amplification circuit (differential amplification circuit, for example). The resultant analog signal is converted into a digital signal by an analog-to-digital (A/D) conversion circuit. The resultant digital signal is input to a program processing device, such as a microcontroller. The program processing device performs a predetermined computation process on the input signal to calculate a measured value of the flow rate. Such capacitance-type electromagnetic flowmeters have particularly received attention recently because electrodes thereof are resistant to damage and are easy to maintain.

However, since capacitance-type electromagnetic flowmeters are configured such that the electrodes are not in contact with a detection-target fluid, impedances between the detection-target fluid and the electrodes are very high. For this reason, such electromagnetic flowmeters have an issue in that entry of noise to a wiring between an input terminal of the signal amplification circuit and each electrode can reduce measurement accuracy and stability.

Techniques of the related art for coping with this issue are disclosed, for example, in Japanese Unexamined Patent Application Publication Nos. 5-172600, 2004-226394, and 2014-202662.

Specifically, Japanese Unexamined Patent Application Publication Nos. 5-172600 and 2004-226394 disclose capacitance-type electromagnetic flowmeters in which two detection electrodes disposed at a pipe (measurement pipe) are covered with guard electrodes and shielded cables are used as signal lines that connect the respective detection electrodes to a differential amplification circuit. With such a configuration, the capacitance-type electromagnetic flowmeters prevent noise from entering the signal lines located between the detection electrodes and a signal amplification circuit.

In the case of using shielded cables, an attenuation rate of a signal propagating through a core wire, which is caused by a capacitance formed between the core wire and a shield conductor of the shielded cables, generally tends to increase in proportion to the length of the shielded cables. Thus, in the electromagnetic flowmeters disclosed in Japanese Unexamined Patent Application Publication Nos. 5-172600 and 2004-226394, preamplifiers are each connected between one of the two detection electrodes and a corresponding one of two input terminals of the differential amplification circuit so as to convert a detection signal detected by the detection electrode into a low-impedance detection signal and allow the low-impedance detection signal to propagate through the core wire of the shielded cable. In addition, the shield conductor of the shielded cable is driven by this low-impedance detection signal. In this way, attenuation of the detection signal that propagates through the core wire of each shielded cable is prevented.

In addition, Japanese Unexamined Patent Application Publication No. 2014-202662 discloses a capacitance-type electromagnetic flowmeter in which two preamplifiers each connected to a corresponding one of two detection electrodes disposed at a measurement pipe are mounted on different boards (preamplifier boards) and these preamplifier boards are each arranged to be closest to the corresponding detection electrode and in which the two preamplifier boards and the corresponding detection electrodes are covered with respective shield cases. In this way, entry of noise to signal lines located between the detection electrodes and the preamplifiers is prevented.

However, it has become apparent that the capacitance-type electromagnetic flowmeters disclosed in Japanese Unexamined Patent Application Publication Nos. 5-172600, 2004-226394, and 2014-202662 have the following issues.

Since the electromagnetic flowmeters disclosed in Japanese Unexamined Patent Application Publication Nos. 5-172600 and 2004-226394 suppress attenuation of a signal due to a capacitance formed between the core wire and the shield conductor of the shielded cable by setting potentials of the core wire and the shield conductor of the shielded cable to be equal, the preamplifiers need to be buffer amplifiers. Thus, the electromagnetic flowmeters disclosed in Japanese Unexamined Patent Application Publication Nos. 5-172600 and 2004-226394 may fail to remove common-mode noise by using the preamplifiers, and consequently measurement accuracy and stability of the electromagnetic flowmeters may decrease.

In addition, since an output signal may be saturated due to the influence of common-mode noise if the gain of the preamplifiers is increased in the electromagnetic flowmeter disclosed in Japanese Unexamined Patent Application Publication No. 2014-202662, the preamplifiers need to be buffer amplifiers having a gain of 1 as in the electromagnetic flowmeters disclosed in Japanese Unexamined Patent Application Publication Nos. 5-172600 and 2004-226394. Thus, just like the electromagnetic flowmeters disclosed in Japanese Unexamined Patent Application Publication Nos. 5-172600 and 2004-226394, the electromagnetic flowmeter disclosed in Japanese Unexamined Patent Application Publication No. 2014-202662 may fail to remove common-mode noise by using the preamplifiers, and consequently measurement accuracy and stability of the electromagnetic flowmeter may decrease.

As described above, flow rate measurement accuracy and stability of capacitance-type electromagnetic flowmeters of the related art may decrease.

SUMMARY

The present disclosure has been made in view of the foregoing issues, and it is an object of the present disclosure to improve flow rate measurement accuracy and stability of capacitance-type electromagnetic flowmeters.

An electromagnetic flowmeter (10) according to an aspect of the present disclosure includes a measurement pipe (Pex) in which a fluid subjected to detection flows; an exciting coil (Lex_1, Lex_2) disposed on an outer side of the measurement pipe, the exciting coil generating a magnetic field according to a current (Iex) supplied thereto; a pair of a first electrode (Ea) and a second electrode (Eb) disposed on an outer circumferential surface of the measurement pipe so as to face each other in a direction perpendicular to the magnetic field generated by the exciting coil; a preamplifier circuit (21) that amplifies an electromotive force generated between the first electrode and the second electrode; a board (40) on which the preamplifier circuit is mounted; a shield case (30) disposed on the board; and a data processing control circuit (12) that calculates a flow rate of the fluid in accordance with a signal resulting from the amplification performed by the preamplifier circuit, wherein the preamplifier circuit includes a first operational amplifier (23), a second operational amplifier (24), a first wiring (La) connecting the first electrode and a non-inverting input terminal (+) of the first operational amplifier to each other, a second wiring (Lb) connecting the second electrode and a non-inverting input terminal (+) of the second operational amplifier, a first resistor (RF1) connected between an output terminal of the first operational amplifier and an inverting input terminal (−) of the first operational amplifier, a second resistor (RF2) connected between an output terminal of the second operational amplifier and an inverting input terminal (−) of the second operational amplifier, and a third resistor (RG) connected between the inverting input terminal of the first operational amplifier and the inverting input terminal of the second operational amplifier, wherein the preamplifier circuit has an amplification factor greater than 1, and wherein the shield case is disposed on the board so as to surround the first operational amplifier, the second operational amplifier, the first wiring, the second wiring, the first electrode, and the second electrode.

In the electromagnetic flowmeter, the first operational amplifier and the second operational amplifier may be disposed on the board in close proximity to each other.

In the electromagnetic flowmeter, the first operational amplifier and the second operational amplifier may be sealed in a single integrated circuit package.

The electromagnetic flowmeter may further include a subtracter circuit (22) that generates a signal ($V_{FL}$) based on a result of subtraction of a signal (Va) output from the first operational amplifier and a signal (Vb) output from the second operational amplifier, wherein the data processing control circuit (12) may calculate the flow rate of the fluid in accordance with the signal ($V_{FL}$) based on the result of the subtraction; the subtracter circuit may include a third operational amplifier (25), a fourth resistor (R1) connected between the output terminal of the first operational amplifier and a non-inverting input terminal (+) of the third operational amplifier, a fifth resistor (R2) connected between the output terminal of the second operational amplifier and an inverting input terminal (−) of the third operational amplifier, a sixth resistor (R3) having one end supplied with a reference voltage ($V_{REF}$) and another end connected to the non-inverting input terminal of the third operational amplifier, and a seventh resistor (R4) connected between the inverting input terminal of the third operational amplifier and an output terminal of the third operational amplifier; and the subtracter circuit may have an amplification factor ($A_{d2}$) smaller than the amplification factor ($A_{d1}$) of the preamplifier circuit.

In the electromagnetic flowmeter, the amplification factor of the subtracter circuit may be equal to 1.

In the electromagnetic flowmeter, the board (40) may have a first principal surface (40A) on which the first operational amplifier and the second operational amplifier are mounted, a second principal surface (40B) opposite to the first principal surface, a shield pattern (41) disposed on the second principal surface, connected to a fixed potential ($V_{COM}$), and composed of a metal, and a through hole (48) penetrating through the board from the first principal surface to the second principal surface; the measurement pipe may be inserted in the through hole; the shield case (30) may be disposed on the first principal surface so as to surround the measurement pipe; and the exciting coil may be disposed on an outer side of the shield case.

In the electromagnetic flowmeter (10B), the shield case may include a first case (30a) disposed on the first principal surface so as to surround the measurement pipe, the first electrode, and the second electrode, the first case being composed of a conductive material; and a second case (30b) disposed on the first principal surface so as to surround the first operational amplifier and the second operational amplifier, the second case being composed of a conductive material.

In the electromagnetic flowmeter, the first wiring (La) may include a first electrode-side wiring pattern (60a) disposed on the outer circumferential surface of the measurement pipe so as to extend from the first electrode (Ea) toward the board, the first electrode-side wiring pattern being composed of a metal; a first preamplifier-side wiring pattern (42a) disposed on the board and composed of a metal; and a first jumper wire (50a) connecting the first electrode-side wiring pattern and the first preamplifier-side wiring pattern to each other, the first jumper wire having a length that is less than wire lengths of the first electrode-side wiring pattern and the first preamplifier-side wiring pattern, and the second wiring (Lb) may include a second electrode-side wiring pattern (60b) disposed on the outer circumferential surface of the measurement pipe so as to extend from the second electrode (Eb) toward the board, the second electrode-side wiring pattern being composed of a metal; a second preamplifier-side wiring pattern (42b) disposed on the board and composed of a metal; and a second jumper wire (50b) connecting the second electrode-side wiring pattern and the second preamplifier-side wiring pattern to each other, the second jumper wire having a length that is less than wire lengths of the second electrode-side wiring pattern and the second preamplifier-side wiring pattern.

In the electromagnetic flowmeter, the first preamplifier-side wiring pattern and the second preamplifier-side wiring pattern may be disposed on the board so as to be symmetric with respect to a line linking the first electrode, the second electrode, and an axis of the measurement pipe in plan view.

In the electromagnetic flowmeter (10A), the board (45) may be a multilayer board; the board may have a first guard pattern (43a) and a second guard pattern (43b) disposed on a layer of the board located between the second principal surface on which the shield pattern is disposed and a layer on which the first preamplifier-side wiring pattern and the second preamplifier-side wiring pattern are disposed, the first guard pattern and the second guard pattern being composed of a metal; the first guard pattern may have an overlap with the first preamplifier-side wiring pattern in plan view and may be connected to the inverting input terminal of the first operational amplifier; and the second guard pattern may have an overlap with the second preamplifier-side wiring pattern in plan view and may be connected to the inverting input terminal of the second operational amplifier.

In the electromagnetic flowmeter (10B), the board may further have a third guard pattern (44a) and a fourth guard pattern (44b) disposed on the first principal surface of the board, the third guard pattern and the fourth guard pattern being composed of a metal; the first preamplifier-side wiring pattern and the second preamplifier-side wiring pattern may be disposed on the layer of the board located between the first principal surface and the layer on which the first guard pattern and the second guard pattern are disposed; the third guard pattern may have an overlap with the first preamplifier-side wiring pattern in plan view and may be connected to the inverting input terminal of the first operational amplifier; and the fourth guard pattern may have an overlap with the second preamplifier-side wiring pattern in plan view and may be connected to the inverting input terminal of the second operational amplifier.

In the electromagnetic flowmeter, a portion of the first electrode-side wiring pattern that extends in a direction of an axis (Z-axis direction) of the measurement pipe on the outer circumferential surface of the measurement pipe may have an overlap with a portion of the second electrode-side wiring pattern that extends in the direction of the axis (Z-axis direction) of the measurement pipe in plan view from a direction of a magnetic flux (B) generated by the exciting coil.

According to the aspect of the present disclosure, flow rate measurement accuracy and stability of capacitance-type electromagnetic flowmeters can be improved.

BRIEF DESCRIPTION OF THE DRAWINGS

FIG. 5C is a schematic side view of the structure around the detection unit of the electromagnetic flowmeter according to the first embodiment.

FIG. 7B is a schematic perspective view of the structure of the electrodes and the electrode-side wiring patterns.

FIG. 8A is a diagram illustrating an arrangement example of the electrode-side wiring patterns with respect to a magnetic flux generated by an exciting coil.

DETAILED DESCRIPTION

Embodiments of the present disclosure will be described below with reference to the accompanying drawings. In the following description, components that are described in embodiments in common are denoted by the same reference signs to omit a repeated description.

First Embodiment

Configuration of Electromagnetic Flowmeter

Figure 1:
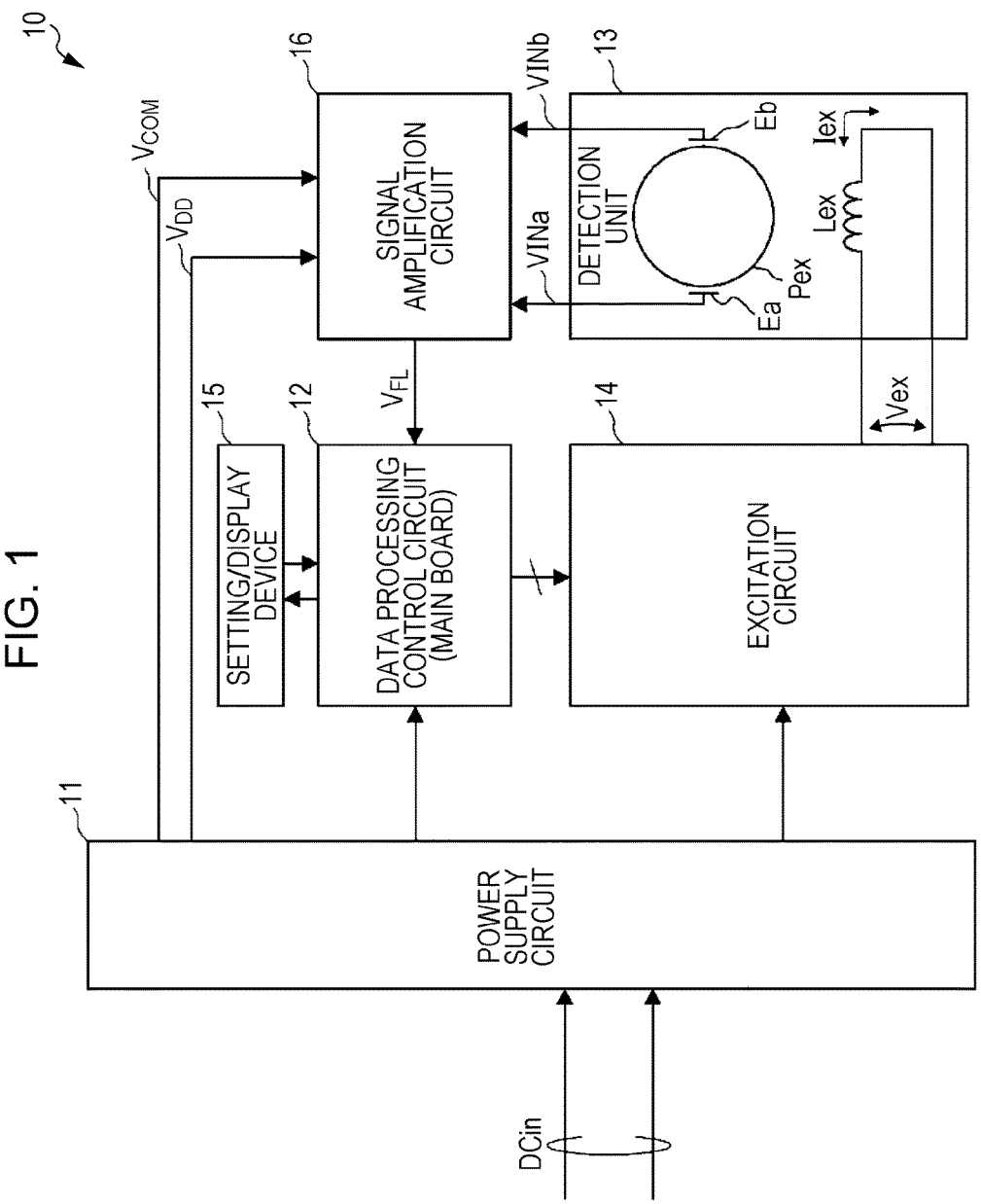
FIG. 1 is a diagram illustrating a configuration of an electromagnetic flowmeter according to a first embodiment.

FIG. 1 is a diagram illustrating a configuration of an electromagnetic flowmeter 10 according to a first embodiment.

The electromagnetic flowmeter 10 illustrated in FIG. 1 has a function of measuring a flow rate of a conductive fluid. The electromagnetic flowmeter 10 supplies a polarity-alternating exciting current Iex to an exciting coil Lex arranged such that a direction in which a magnetic field is generated is perpendicular to a direction in which the fluid flows in a measurement pipe Pex. The electromagnetic flowmeter 10 detects an electromotive force generated between a pair of electrodes Ea and Eb disposed at the measurement pipe Pex perpendicularly to the magnetic field generated by the exciting coil Lex. The electromagnetic flowmeter 10 amplifies the detected electromotive force, performs sampling on the resultant signal, and performs signal processing on the sampled signal to measure a flow rate of the fluid flowing in the measurement pipe Pex.

Specifically, the electromagnetic flowmeter 10 includes a power supply circuit 11, a data processing control circuit 12, a detection unit 13, an excitation circuit 14, a setting/display device 15, and a signal amplification circuit 16 as main functional units thereof.

The power supply circuit 11 is a circuit that generates a plurality of direct-current (DC) voltages from a DC power supply input DCin (24 V, for example) fed from a higher-level apparatus (not illustrated) and supplies the plurality of DC voltages to the data processing control circuit 12, the signal amplification circuit 16, and the excitation circuit 14. The power supply circuit 11 includes, for example, a switching regulator, a series regulator, or the like. For example, the power supply circuit 11 serves as an operation power supply of the signal amplification circuit 16 and generates a power supply voltage $V_{DD}$ and a ground potential $V_{COM}$ (0 V) from the DC power supply input DCin.

Note that the voltage representing reference signs "$V_{DD}$" and "$V_{COM}$" not only represent the voltages but also represent signal lines supplied with the voltages.

The detection unit 13 includes the measurement pipe Pex, the exciting coil Lex, and the pair of detection electrodes Ea and Eb. A fluid subjected to flow rate measurement flows in the measurement pipe Pex. The exciting coil Lex generates a magnetic field toward the measurement pipe Pex in accordance with an exciting current supplied thereto from the excitation circuit 14. The pair of electrodes Ea and Eb is disposed on an outer circumferential surface of the measurement pipe Pex to face each other in a direction perpendicular to the magnetic field generated by the exciting coil Lex. A specific structure of the detection unit 13 will be described later.

The excitation circuit 14 has a function of supplying the exciting coil Lex of the detection unit 13 with the exciting current Iex whose excitation polarity is alternated in a predetermined period, in accordance with control performed by the data processing control circuit 12.

The setting/display device 15 has a function of detecting a setting operation input by an operator and outputting a corresponding signal to the data processing control circuit 12 and a function of displaying an output from the data processing control circuit 12 using a light-emitting diode (LED) or a liquid crystal display (LCD).

The signal amplification circuit 16 is a functional unit that operates by using the power supply voltage $V_{DD}$ and the ground potential $V_{COM}$ (0 V) to amplify a voltage generated between the pair of electrodes Ea and Eb of the detection unit 13 and to output the resultant signal as a flow rate signal $V_{FL}$. A specific configuration of the signal amplification circuit 16 will be described later.

The data processing control circuit 12 includes a program processing device (for example, a central processing unit (CPU)), a signal processing circuit, a transmission interface (I/F) circuit, etc. The data processing control circuit 12 has a function of controlling the excitation circuit 14, a function of calculating a flow rate, and a function of outputting data of the flow rate to a higher-level apparatus (not illustrated). Note that the data processing control circuit 12 is mounted on a board different from a board on which a preamplifier circuit 21 of the signal amplification circuit 16 (described later) is mounted.

Specifically, the data processing control circuit 12 periodically alternates the polarity of the exciting current Iex supplied to the exciting coil Lex to generate a magnetic field in the measurement pipe Pex.

The data processing control circuit 12 also calculates a flow rate of a detection-target fluid flowing in the measurement pipe Pex on the basis of the flow rate signal $V_{FL}$ that is output from the signal amplification circuit 16 and is based on the voltage generated between the electrodes Ea and Eb.

Configuration of Signal Amplification Circuit 16

The signal amplification circuit 16 of the electromagnetic flowmeter 10 according to the first embodiment will be described in detail next.

Figure 2:
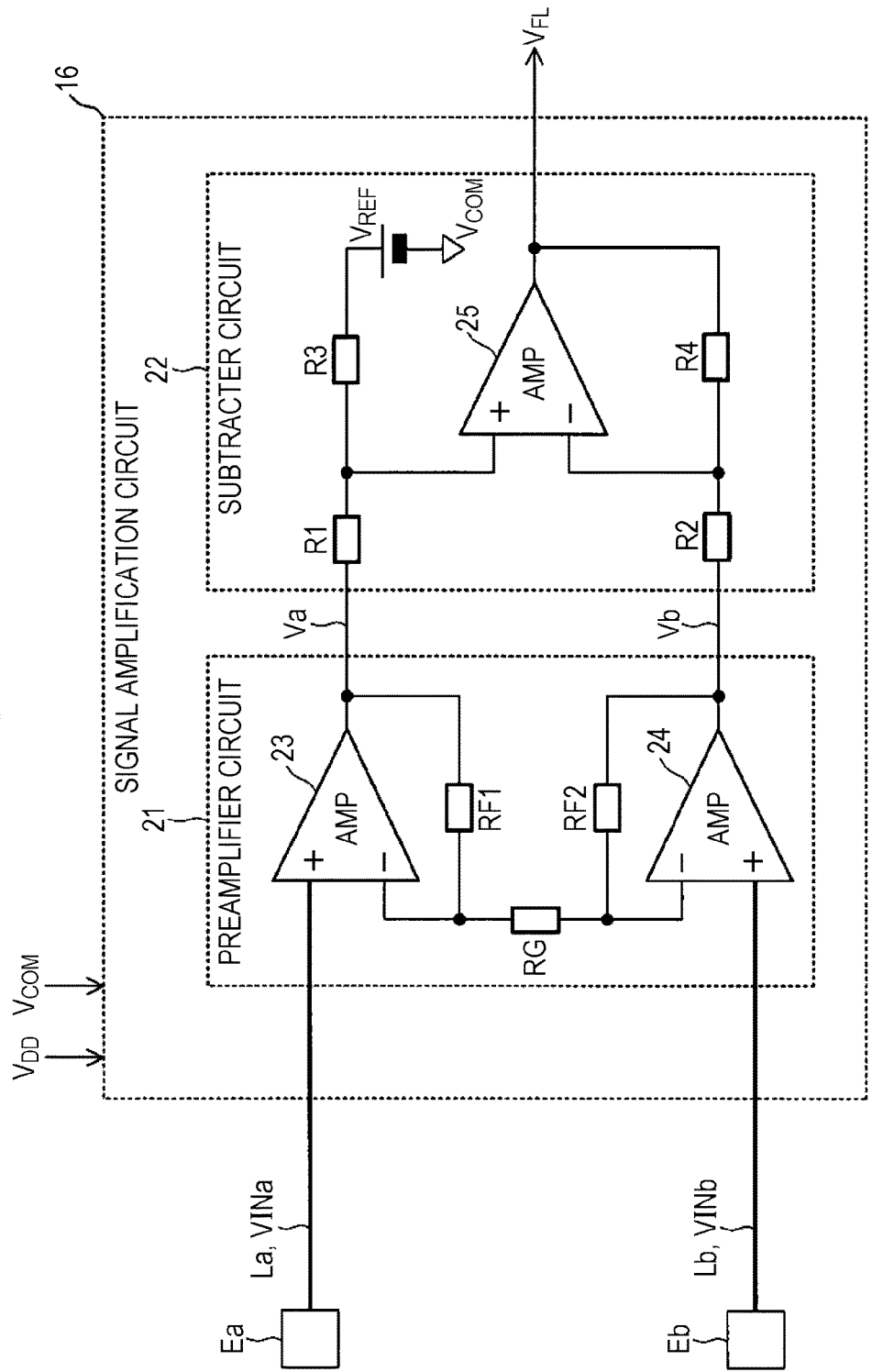
FIG. 2 is a diagram illustrating a configuration of a signal amplification circuit of the electromagnetic flowmeter according to the first embodiment.

FIG. 2 is a diagram illustrating a configuration of the signal amplification circuit 16 of the electromagnetic flowmeter 10 according to the first embodiment.

An feature of the signal amplification circuit 16 illustrated in FIG. 2 is that the signal amplification circuit 16 amplifies detection signals detected by the electrodes Ea and Eb by using a differential amplification circuit including two operational amplifiers sealed in a single integrated circuit (IC) package.

Specifically, the signal amplification circuit 16 includes the preamplifier circuit 21 and a subtracter circuit 22.

The preamplifier circuit 21 is a circuit that generates differential signals Va and Vb based on a difference between a voltage VINa at the electrode Ea and a voltage VINb at the electrode Eb.

Specifically, the preamplifier circuit 21 includes operational amplifiers 23 and 24 and resistors RG, RF1, and RF2. The operational amplifiers 23 and 24 are sealed in a single IC package 20.

Figure 3:
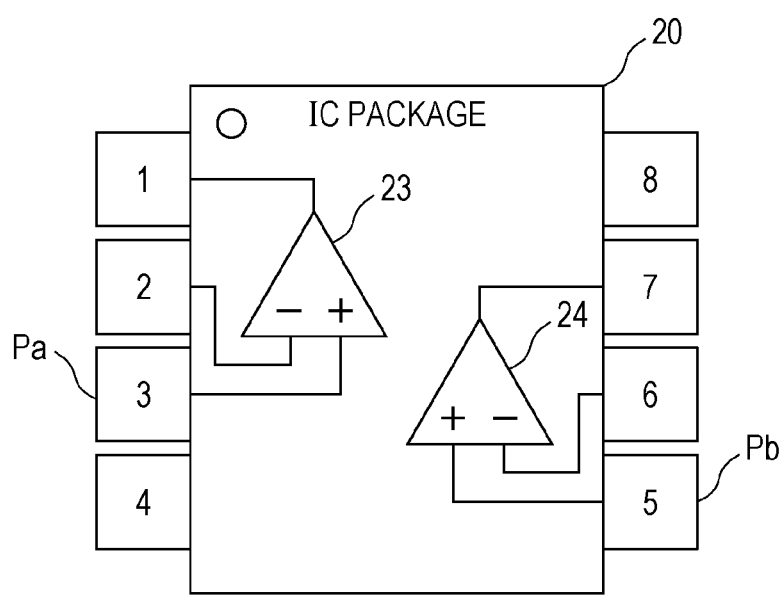
FIG. 3 is a diagram schematically illustrating a configuration of an integrated circuit (IC) package of a dual operational amplifier IC.

FIG. 3 is a diagram schematically illustrating a configuration of the IC package 20.

As illustrated in FIG. 3, the operational amplifiers 23 and 24 among the aforementioned circuit components constituting the preamplifier circuit 21 are sealed in the single IC package 20.

The package type of the IC package 20 is not limited to a particular type. That is, the IC package 20 may be a small outline package (SOP), a dual inline package (DIP), or a ball grid array (BGA).

At least the operational amplifiers 23 and 24 are required to be sealed in the IC package 20. That is, for example, the resistors RF1 and RF2 may be sealed in the IC package 20 in addition to the operational amplifiers 23 and 24.

In the first embodiment, the description is given of the case where the IC package 20 is a dual operational amplifier IC obtained by sealing the operational amplifiers 23 and 24 having the same or substantially the same characteristics in a single package and the resistors RF1, RF2, and RG are provided outside the IC package 20 by way of example.

However, the configuration is not limited to this one, and the operational amplifiers 23 and 24 may be sealed in different IC packages.

In addition, in the first embodiment, an external terminal of the IC package 20 to which a non-inverting input terminal (+) of the operational amplifier 23 is connected is denoted by a terminal Pa, and an external terminal of the IC package 20 to which a non-inverting input terminal (+) of the operational amplifier 24 is connected is denoted by a terminal Pb.

As illustrated in FIG. 2, the operational amplifiers 23 and 24 and the resistors RG, RF1, and RF2 constitute a single differential amplification circuit.

Specifically, the non-inverting input terminal (+) of the operational amplifier 23 is connected to the electrode Ea by a wiring La, and the non-inverting input terminal (+) of the operational amplifier 24 is connected to the electrode Eb by a writing Lb. The resistor RF1 is connected between an output terminal Va of the operational amplifier 23 and an inverting input terminal (−) of the operational amplifier 23. The resistor RF2 is connected between an output terminal Vb of the operational amplifier 24 and an inverting input terminal (−) of the operational amplifier 24. The resistor RG is connected between the inverting input terminal (−) of the operational amplifier 23 and the inverting input terminal (−) of the operational amplifier 24.

Note that the reference signs Va and Vb not only represent the output terminals of the operational amplifiers 23 and 24 but also represent voltages (output signals) at the output terminals of the operational amplifiers 23 and 24, respectively.

As illustrated in FIG. 2, the subtracter circuit 22 is connected to the preamplifier circuit 21, as a subsequent stage.

The subtracter circuit 22 is a circuit that outputs, as the flow rate signal $V_{FL}$, a signal based on a subtraction result of the output voltage Va of the operational amplifier 23 and the output voltage Vb of the operational amplifier 24.

Note that the reference sign "$V_{FL}$" not only represents the flow rate signal but also an output terminal of the subtracter circuit 22 (an output terminal of an operational amplifier 25 (described later)).

Specifically, the subtracter circuit 22 includes resistors R1, R2, R3, and R4 and the operational amplifier 25.

The resistor R1 is connected between the output terminal Va of the operational amplifier 23 and a non-inverting input terminal (+) of the operational amplifier 25. The resistor R2 is connected between the output terminal Vb of the operational amplifier 24 and an inverting input terminal (−) of the operational amplifier 25. One end of the resistor R3 is supplied with a reference voltage $V_{REF}$, and the other end of the resistor R3 is connected to the non-inverting input terminal (+) of the operational amplifier 25. The resistor R4 is connected between the inverting input terminal (−) of the operational amplifier 25 and the output terminal $V_{FL}$ of the operational amplifier 25.

The reference voltage $V_{REF}$ is generated by a constant voltage generation circuit (not illustrated). The constant voltage generation circuit may be included in the signal amplification circuit 16 or in the power supply circuit 11.

Now, amplification factors of the preamplifier circuit 21 and the subtracter circuit 22 will be described.

An amplification factor (differential gain) $A_{d1}$ of the preamplifier circuit 21 can be denoted by Equation (1).

$$A_{d1} = \frac{Vout1}{VINa - VINb} = \left(1 + \frac{2 \times RF1}{RG}\right) \quad (1)$$

In Equation (1), Vout1 denotes a voltage at the output terminal Va relative to the output terminal Vb, that is, the output voltage of the preamplifier circuit 21. In addition, VINa denotes a voltage supplied to the non-inverting input terminal (+) of the operational amplifier 23 from the electrode Ea, and VINb denotes a voltage supplied to the non-inverting input terminal (+) of the operational amplifier 24 from the electrode Eb. Further, a resistance of the resistor RF2 is set equal to a resistance of the resistor RF1.

As is understood from Equation (1), the preamplifier circuit 21 is capable of adjusting the amplification factor (differential gain) $A_{d1}$ on the basis of resistances of the resistors RF1 (RF2) and RG.

In addition, an amplification factor (differential gain) $A_{d2}$ of the subtracter circuit 22 can be denoted by Equation (2).

In Equation (2), Vout2 denotes the flow rate signal, that is, the output voltage of the subtracter circuit 22, Va denotes the output voltage of the operational amplifier 23, and Vb denotes the output voltage of the operational amplifier 24. In addition, a resistance of the resistor R2 is set equal to a resistance of the resistor R1, and a resistance of the resistor R4 is set equal to a resistance of the resistor R3.

$$A_{d2} = \frac{Vout2}{Va - Vb} = \frac{R3}{R1} \quad (2)$$

As is understood from Equation (2), the subtracter circuit 22 is capable of adjusting the amplification factor (differential gain) $A_{d2}$ on the basis of resistances of the resistors R1 (R2) and R3 (R4).

By setting the amplification factor (differential gain) $A_{d1}$ of the preamplifier circuit 21 to a value greater than "1", a common mode rejection ratio (CMRR) of the signal amplification circuit 16 can be improved compared with the case of using a preamplifier circuit according to the related art including two buffer amplifiers disclosed in Japanese Unexamined Patent Application Publication Nos. 5-172600 and 2004-226394. Details of this will be described below.

In the preamplifier circuit 21, the resistances of the resistors RF1 and RF2 are set to be equal. Now, the case where there is a mismatch between the resistances of the resistors RF1 and RF2 is considered. In this case, if the signal levels (voltages) of the signals VINa and VINb that are respectively input to the non-inverting input terminals (+) of the operational amplifiers 23 and 24 are equal, the inverting input terminals (−) of the operational amplifiers 23 and 24 have an equal potential because of virtual short circuit of the operational amplifiers 23 and 24. Consequently, no current flows through the resistors RG, RF1, and RF2.

That is, in the preamplifier circuit 21, the operational amplifiers 23 and 24 function as buffer amplifiers for common-mode signals even if there is a mismatch between the resistances of the resistors RF1 and RF2 and do not perform an amplification operation. However, for differential signals, the operational amplifiers 23 and 24 perform an amplification operation in accordance with the amplification factor $A_{d1}$ determined by Equation (1). Thus, by increasing the amplification factor $A_{d1}$, the preamplifier circuit 21 is able to achieve a high CMRR.

On the other hand, the subtracter circuit 22 at the subsequent stage is able to obtain ideal characteristics if the resisters R1 and R2 have equal resistances and the resistors R3 and R4 have equal resistances; however, a mismatch occurs in practice between the resistances due to variations of the resistors R1 and R2 and the resistors R3 and R4. Not only differential signals but also common-mode signals are amplified due to this mismatch. Consequently, the CMRR deteriorates.

Thus, by setting the amplification factor $A_{d1}$ of the preamplifier circuit 21 to a value greater than "1", the CMRR of the preamplifier circuit 21 can be increased.

In addition, by setting the amplification factor $A_{d2}$ of the subtracter circuit 22 to be less than the amplification factor $A_{d1}$ of the preamplifier circuit 21, the signal amplification circuit 16 is able to appropriately amplify differential signals while suppressing amplification of common-mode signals even if there is a mismatch between the resistances of the resistors R1 and R2 or a mismatch between the resistances of the resistors R3 and R4 in the subtracter circuit 22. For example, by setting the amplification factor $A_{d2}$ of the subtracter circuit 22 to 1, the CMRR of the entire signal amplification circuit 16 can be improved.

The preamplifier circuit 21 is mounted on a single board 40. The board 40 is, for example, a printed circuit board. An example of the printed circuit board may be a glass epoxy board.

It is assumed in the first embodiment that the board 40 is a printed circuit board, and the board 40 is also referred to as a "printed circuit board 40". In addition, in the first embodiment, the description is given on the assumption that the preamplifier circuit 21 and the subtracter circuit 22 are mounted on different boards.

Figure 4A:
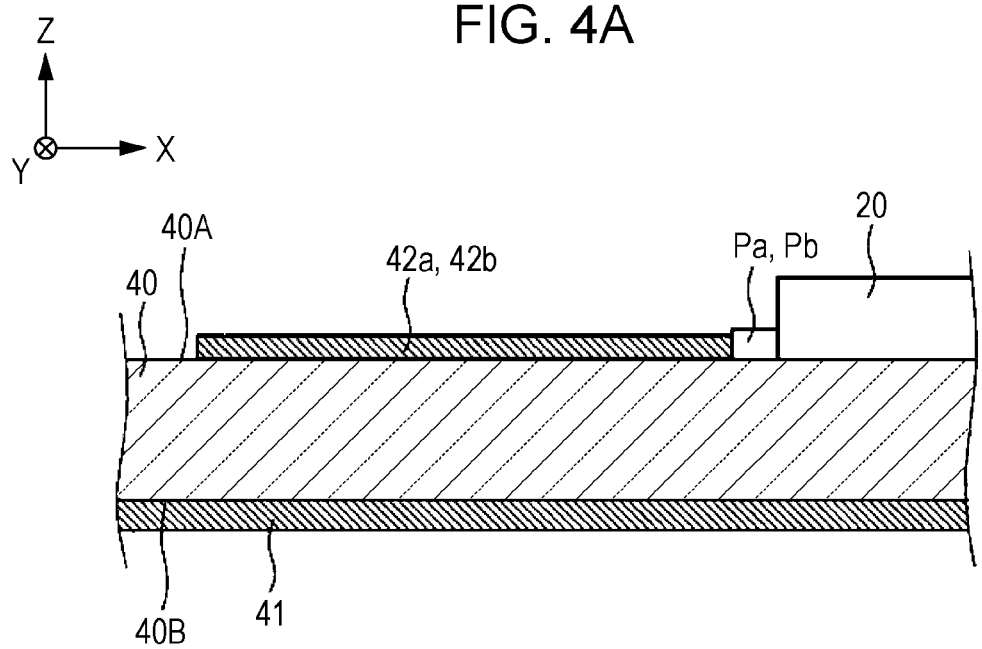
FIG. 4A is a diagram schematically illustrating a cross-sectional structure of a printed circuit board of the electromagnetic flowmeter according to the first embodiment.

FIG. 4A is a diagram schematically illustrating a cross-sectional structure of the printed circuit board 40.

As illustrated in FIG. 4A, the printed circuit board 40 has principal surfaces 40A and 40B.

Various electronic components constituting the preamplifier circuit 21, for example, the IC package 20 and the resistors RG, RF1, and RF2 are fixed to the principal surface 40A of the printed circuit board 40. In addition, various wiring patterns for electrically connecting these electronic components are disposed on the principal surface 40A.

A shield pattern 41 is disposed on the principal surface 40B of the printed circuit board 40.

The shield pattern 41 is, for example, a metal pattern just like the wiring patterns and is connected to the ground potential $V_{COM}$. As illustrated in FIG. 4A, the shield pattern 41 has, in plan view, overlaps with preamplifier-side wiring patterns 42a and 42b that serve as parts of the wirings La and Lb connected to the electrodes Ea and Eb, respectively, and are disposed on the principal surface 40A.

In the first embodiment, the description is given on the assumption that the shield pattern 41 is a pattern that covers the entire principal surface 40B by way of example.

In addition, in the first embodiment, the description is given on the assumption that the preamplifier circuit 21 and the subtracter circuit 22 at the subsequent stage are mounted on different printed circuit boards by way of example. That is, not only the circuit components of the preamplifier circuit 21 but also some or all of the circuit components (the operational amplifier 25 and the resistors R1 to R4) of the subtracter circuit 22 at the subsequent stage may be mounted on the single printed circuit board 40.

Figure 4B:
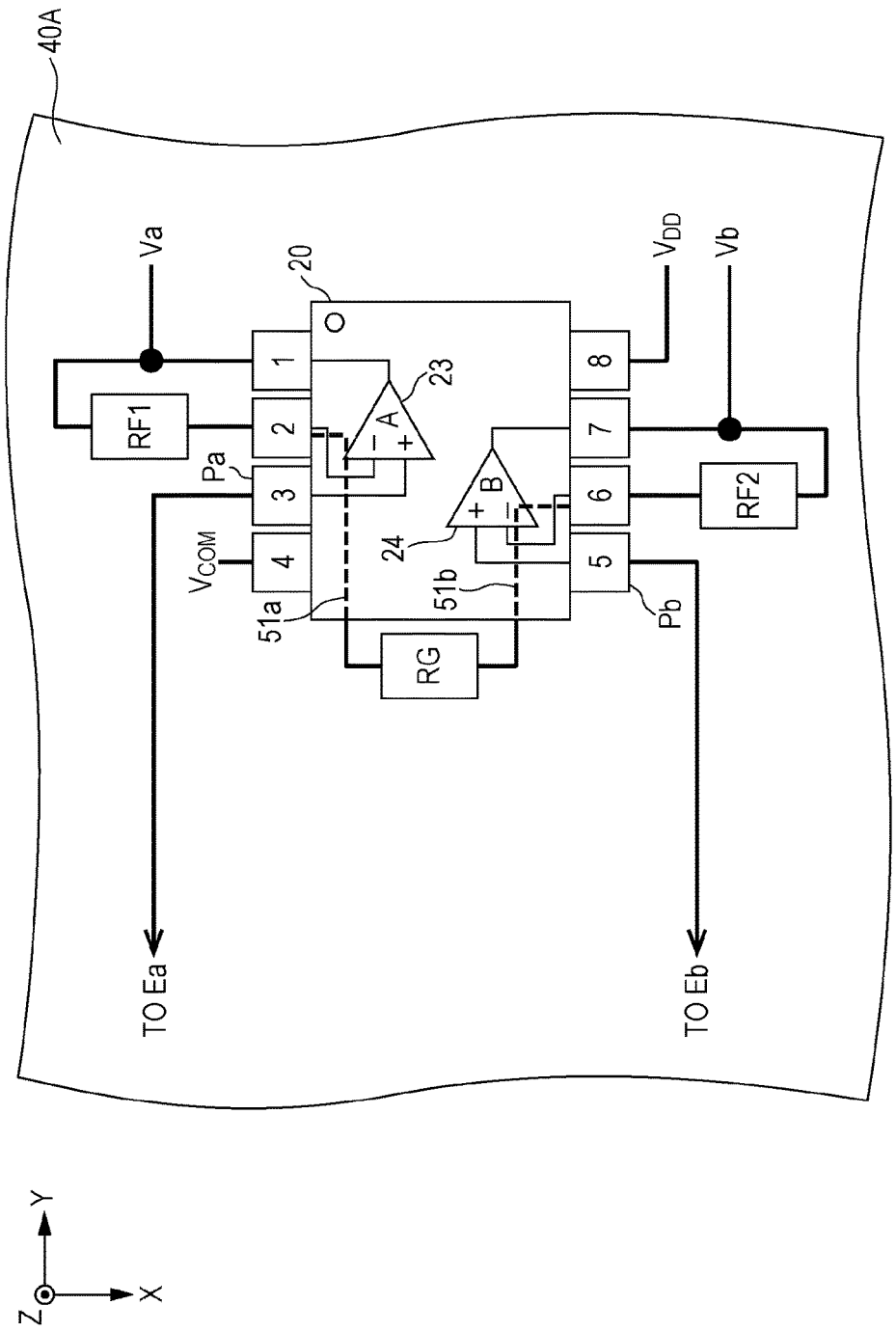
FIG. 4B is a diagram illustrating an arrangement example of components constituting a preamplifier circuit of the electromagnetic flowmeter according to the first embodiment on the printed circuit board.

FIG. 4B is a diagram illustrating an arrangement example of the components constituting the preamplifier circuit 21 on the printed circuit board 40. FIG. 4B schematically illustrates an arrangement of the components constituting the preamplifier circuit 21 when the principal surface 40A of the printed circuit board 40 is viewed from a Z-axis direction.

As illustrated in FIG. 4B, connections between the resistor RG and the inverting input terminals (−) of the operational amplifiers 23 and 24 can be implemented by forming wiring patterns 51a and 51b right under the IC package 20 on the principal surface 40A of the printed circuit board 40.

This configuration eliminates the necessity of forming signal transmitting wiring patterns on the principal surface (back surface) 40B of the printed circuit board 40, allowing formation of the shield pattern (solid pattern) 41 connected to the ground potential $V_{COM}$ all over the principal surface 40B.

Positional Relationship Between Detection Unit 13 and Preamplifier Circuit 21

A positional relationship between the detection unit 13 and the preamplifier circuit 21 will be described next.

Figure 5A:
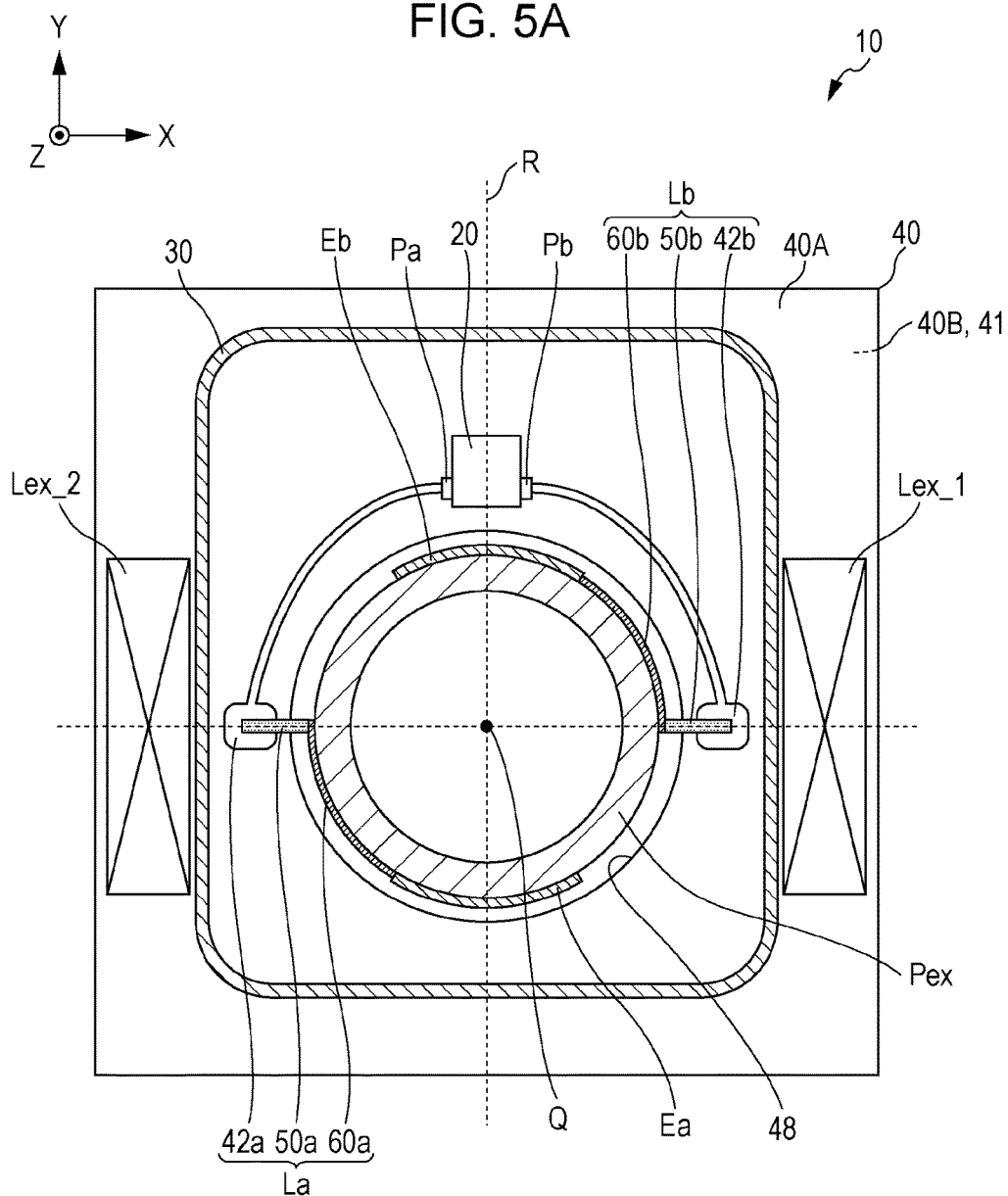
FIG. 5A is a schematic front view of a structure around a detection unit of the electromagnetic flowmeter according to the first embodiment.
Figure 5B:
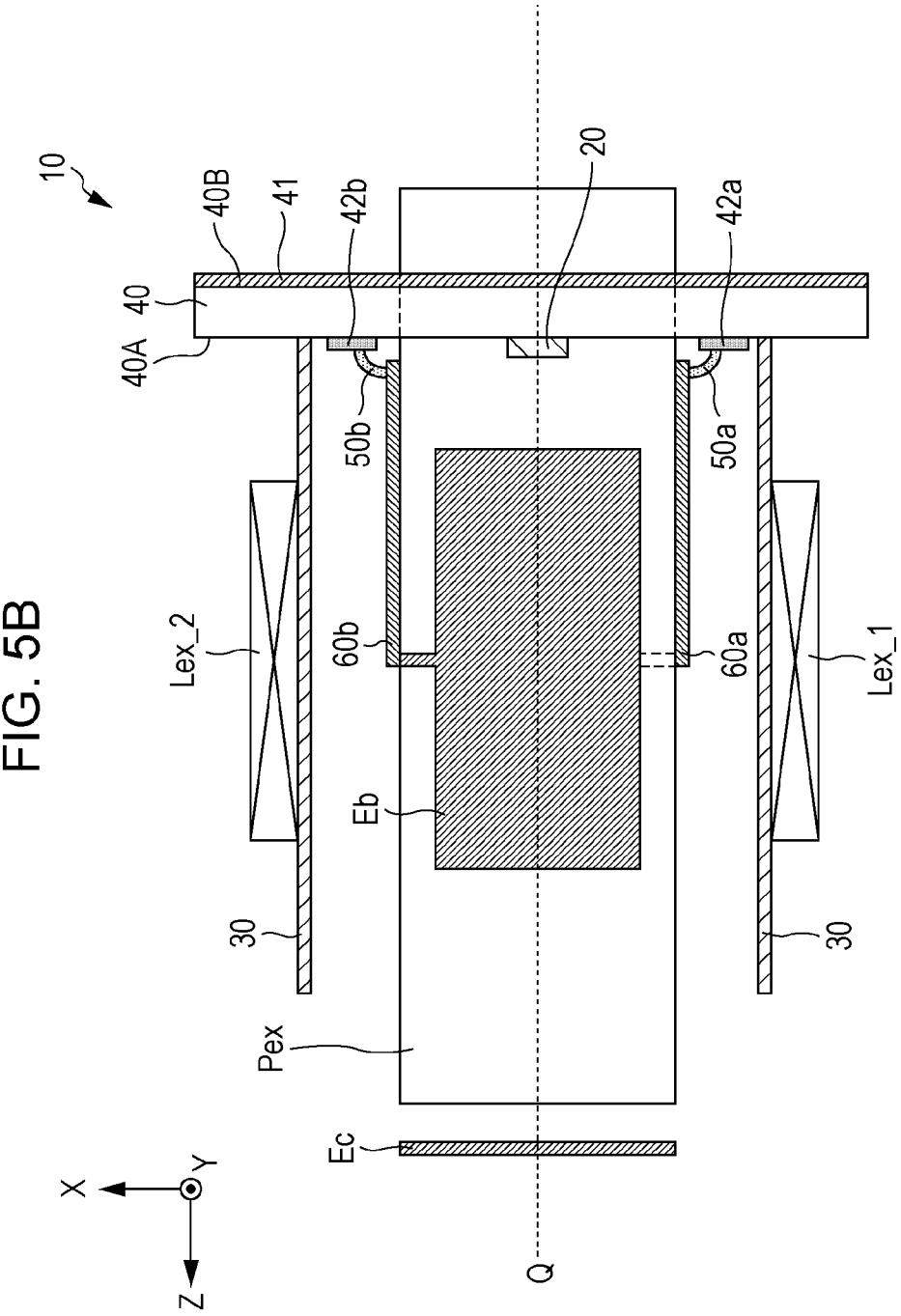
FIG. 5B is a schematic top view of the structure around the detection unit of the electromagnetic flowmeter according to the first embodiment.

FIG. 5A is a schematic front view of a structure around the detection unit 13 of the electromagnetic flowmeter 10 according to the first embodiment. FIG. 5B is a schematic top view of the structure around the detection unit 13 of the electromagnetic flowmeter 10 according to the first embodiment. FIG. 5C is a schematic side view of the structure around the detection unit 13 of the electromagnetic flowmeter 10 according to the first embodiment.

Note that FIGS. 5A to 5C illustrate a case where the exciting coil Lex is constituted by two coils Lex_1 and Lex_2 by way of example. In addition, illustration of the exciting coils Lex_1 and Lex_2 is omitted in FIG. 5C.

Further, a fluid-contact electrode Ec is provided at an end surface of the measurement pipe Pex and is connected to the ground potential $V_{COM}$ to make a potential of the fluid equal to the ground potential $V_{COM}$.

As illustrated in FIGS. 5A to 5C, the printed circuit board 40 has a through hole 48 that penetrates through the printed circuit board 40 from the principal surface 40A to the principal surface 40B. In the vicinity of the through hole 48 on the principal surface 40A of the printed circuit board 40, the IC package 20 in which the operational amplifiers 23 and 24 are sealed is mounted and wiring patterns serving as parts of the wirings La and Lb respectively connecting the operational amplifiers 23 and 24 to the electrodes Ea and Eb are disposed. Note that FIGS. 5A to 5C illustrate the case where the printed circuit board 40 is arranged such that the principal surfaces 40A and 40B of the printed circuit board 40 are parallel to an X-Y plane by way of example.

As illustrated in FIGS. 5A to 5C, the measurement pipe Pex is inserted in the through hole 48 of the printed circuit board 40 such that a central axis Q of the measurement pipe Pex is substantially perpendicular to the principal surfaces 40A and 40B of the printed circuit board 40. That is, the measurement pipe Pex is arranged such that the central axis Q thereof is parallel to the Z axis.

The electrodes Ea and Eb are disposed on an outer circumferential surface of the measurement pipe Pex. For example, the electrodes Ea and Eb are formed of a metal (metal mainly composed of copper, for example) thin film and are attached onto the outer circumferential surface of the measurement pipe Pex formed of a non-conductive material, such as a resin or a ceramic, by using a publicly known thin-film formation technique, such as plating or vapor deposition.

As illustrated in FIGS. 5A to 5C, the wiring La that connects the electrode Ea and the terminal Pa of the IC package 20 (the non-inverting input terminal (+) of the operational amplifier 23) to each other is constituted by an electrode-side wiring pattern 60a disposed on the outer circumferential surface of the measurement pipe Pex, the preamplifier-side wiring pattern 42a disposed on the printed circuit board 40, and a jumper wire 50a that connects the electrode-side wiring pattern 60a and the preamplifier-side wiring pattern 42a to each other.

Likewise, the wiring Lb that connects the electrode Eb and the terminal Pb of the IC package 20 (the non-inverting input terminal (+) of the operational amplifier 24) to each other is constituted by an electrode-side wiring pattern 60b disposed on the outer circumferential surface of the measurement pipe Pex, the preamplifier-side wiring pattern 42b disposed on the printed circuit board 40, and a jumper wire 50b that connects the electrode-side wiring pattern 60b and the preamplifier-side wiring pattern 42b to each other.

The preamplifier-side wiring patterns 42a and 42b are disposed in the vicinity of the through hole 48 on the principal surface 40A of the printed circuit board 40 to be line-symmetric with respect to a line R that links the electrodes Ea and Eb and the central axis Q of the measurement pipe Pex in plan view from the Z-axis direction.

For example, as illustrated in FIG. 5A, the preamplifier-side wiring patterns 42a and 42b are formed to have an arc-like shape along the outer periphery of the through hole 48 from the terminals Pa and Pb of the IC package 20, respectively. In addition, ends of the preamplifier-side wiring patterns 42a and 42b connected to the jumper wires 50a and 50b have a pad shape that is wider than the other portions of the preamplifier-side wiring patterns 42a and 42b, respectively.

In the case where the terminal Pa, which serves as the non-inverting input terminal (+) of the operational amplifier 23, and the terminal Pb, which serves as the non-inverting input terminal (+) of the operational amplifier 24, are aligned to be asymmetric to each other in the IC package 20 as illustrated in FIG. 4B, the wire length of the preamplifier-side wiring pattern 42a and the wire length of the preamplifier-side wiring pattern 42b need not necessarily match completely. For example, in the case where a difference between the wire lengths of the preamplifier-side wiring patterns 42a and 42b is a length equivalent to one or two external terminals (pins) of the IC package 20 as illustrated in FIG. 4B, the difference can be regarded as an error for the wire lengths of the entire wirings La and Lb. Thus, the wire lengths of the preamplifier-side wiring patterns 42a and 42b need not necessarily match completely.

The electrode-side wiring patterns 60a and 60b are disposed on the outer circumferential surface of the measurement pipe Pex to extend from the electrodes Ea and Eb toward the printed circuit board 40, respectively. For example, the electrode-side wiring patterns 60a and 60b are composed of a metal material that is the same as a material of the electrodes Ea and Eb. The electrode-side wiring patterns 60a and 60b can be formed by using the same fabrication method as that used for the electrodes Ea and Eb. For example, the electrode-side wiring patterns 60a and 60b are formed simultaneously with the electrodes Ea and Eb in the same fabrication process.

Note that specific shapes and arrangements of the electrode-side wiring patterns 60a and 60b will be described later.

The jumper wires 50a and 50b are wiring components that three-dimensionally connect the electrode-side wiring patterns 60a and 60b formed to have planar shapes to the preamplifier-side wiring patterns 42a and 42b, respectively. The jumper wires 50a and 50b are, for example, lead wires.

The jumper wire 50a has a wire length that is less than wire lengths of the electrode-side wiring pattern 60a and the preamplifier-side wiring pattern 42a. Likewise, the jumper wire 50b has a wire length that is less than wire lengths of the electrode-side wiring pattern 60b and the preamplifier-side wiring pattern 42b.

As described above, the shield pattern (solid pattern) 41 connected to the ground potential $V_{COM}$ is disposed on the principal surface (back surface) 40B of the printed circuit board 40.

In addition, as illustrated in FIGS. 5A to 5C, a shield case 30 is perpendicularly disposed on the principal surface 40A of the printed circuit board 40. The shield case 30 is arranged on the outer side of the through hole 48 and measurement pipe Pex to surround the IC package 20, the wirings La and Lb, and the electrodes Ea and Eb in plan view from the Z-axis direction. The shield case 30 is formed of a conductive material mainly composed of a metal, for example, copper, aluminum, or iron, to have a cylindrical shape and is connected to the ground potential $V_{COM}$.

Figure 6:
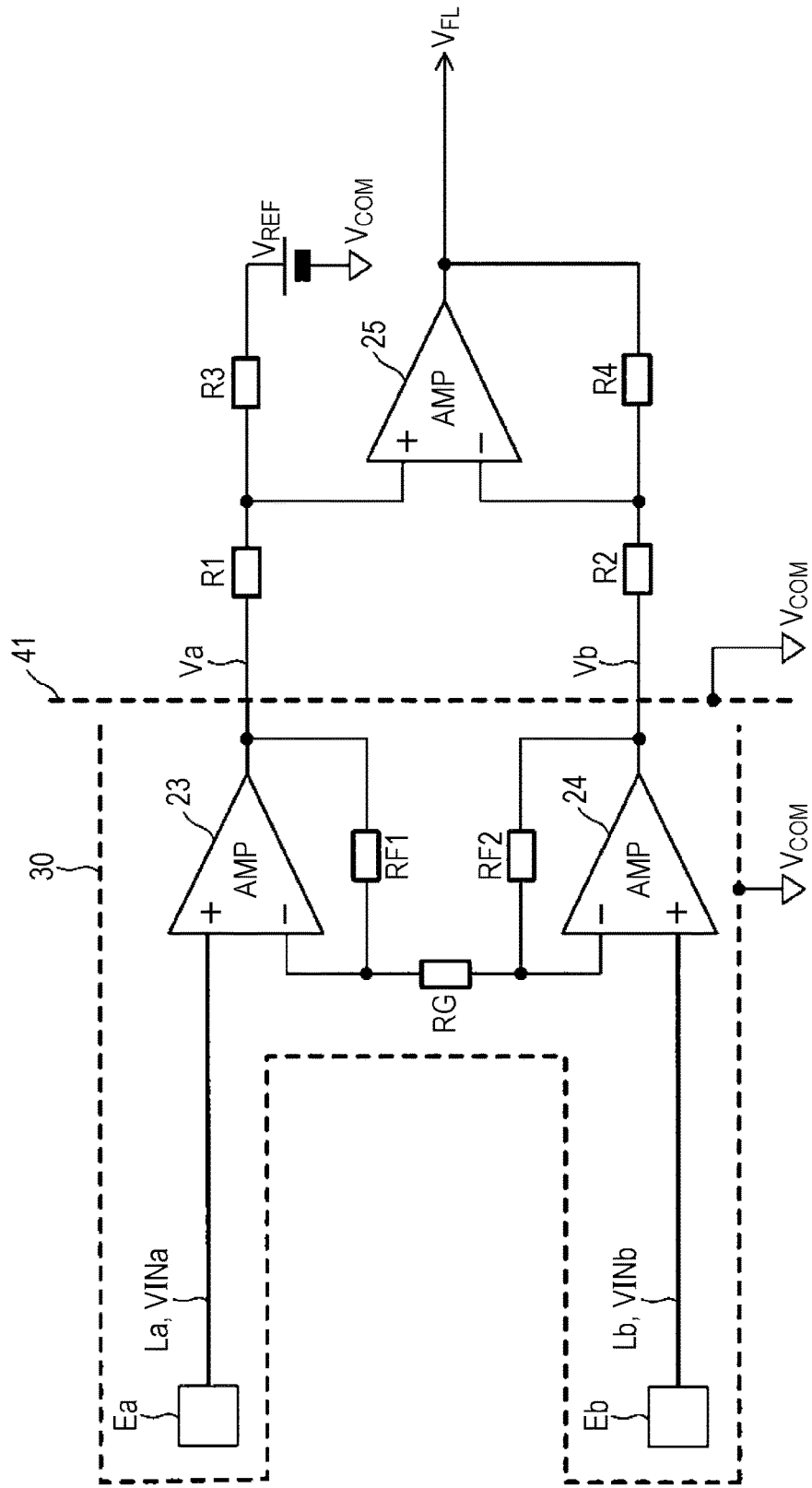
FIG. 6 is a diagram schematically illustrating a shielded range of the signal amplification circuit of the electromagnetic flowmeter according to the first embodiment.

Thus, as illustrated in FIG. 6, a portion having a high impedance in the signal amplification circuit 16, that is, a portion including the electrodes Ea and Eb and the wirings La and Lb, are shielded by the shield pattern 41 and the shield case 30.

As illustrated in FIGS. 5A and 5B, the coils Lex_1 and Lex_2 serving as the exciting coil Lex are arranged on the outer side of the shield case 30. As described above, the electrodes Ea and Eb are arranged to face each other in a direction perpendicular to a direction of a magnetic flux B generated by the coils Lex_1 and Lex_2.

Now, a positional relationship among the operational amplifiers 23 and 24 and the measurement pipe Pex is described.

As illustrated in FIGS. 5A to 5C, the operational amplifiers 23 and 24 are sealed in the single IC package 20 and are mounted on the principal surface 40A of the printed circuit board 40. With this configuration, the operational amplifiers 23 and 24 are disposed at substantially the same position with respect to the measurement pipe Pex in which a detection-target fluid flows. Therefore, the temperature drift direction of the operational amplifier 23 matches the temperature drift direction of the operational amplifier 24, which can consequently suppress a decrease in accuracy and stability of flow rate measurement due to a temperature change. This will be described in detail below by comparing the first embodiment with the related art.

For example, in the electromagnetic flowmeter disclosed in Japanese Unexamined Patent Application Publication No. 2014-202662, the preamplifier boards are arranged to be closest to the respective detection electrodes. Therefore, the preamplifiers are easily influenced by temperature received from a fluid that flows in the measurement pipe. Further, the electromagnetic flowmeter disclosed in Japanese Unexamined Patent Application Publication No. 2014-202662 has a structure in which the two preamplifier boards are arranged to face each other with the central axis of the measurement pipe interposed therebetween. Therefore, the influence of temperature received from the fluid may differ between the preamplifier board arranged on the upper side of a channel in which the fluid flows and the preamplifier board arranged on the lower side of the channel. For example, in the case where the electromagnetic flowmeter is arranged on an X-Y plane such that the central axis of the measurement pipe is parallel to the X-Y plane and the two preamplifier boards are arranged to face each other in the Z-axis direction that is perpendicular to the X-Y plane, temperature received from the fluid differs between the lower side (−Z direction) and the upper side (+Z direction) of the measurement pipe. Thus, the influence of temperature which the preamplifiers on the preamplifier boards receive differs.

For this reason, in the electromagnetic flowmeter disclosed in Japanese Unexamined Patent Application Publication No. 2014-202662, the preamplifiers are easily influenced by temperature from a fluid and the influences of temperature received by the preamplifiers differs. As a result, the preamplifiers have different temperature drift directions, and accuracy and stability of flow rate measurement may decrease greatly.

In contrast, in the electromagnetic flowmeter 10 according to the first embodiment, the two operational amplifiers 23 and 24 of the preamplifier circuit 21 are sealed in the single IC package 20. That is, the operational amplifiers 23 and 24 are arranged to be in close proximity to each other on the single printed circuit board 40. With such an arrangement, distances between the fluid that flows in the measurement pipe and the operational amplifiers 23 and 24 are substantially equal even in the case where the preamplifier circuit 21 is arranged in the vicinity of the measurement pipe Pex and the exciting coil Lex. Consequently, the influences of temperature which the operational amplifiers 23 and 24 receive from the fluid can be substantially the same.

Thus, the electromagnetic flowmeter 10 according to the first embodiment is able to suppress a decrease in accuracy and stability of flow rate measurement due to a temperature change because the operational amplifiers 23 and 24 can have the matching temperature drift directions in response to the temperature change in the fluid in the measurement pipe.

The shapes of the electrodes Ea and Eb and the electrode-side wiring patterns 60a and 60b disposed on the outer circumferential surface of the measurement pipe Pex will be described in detail next.

Figure 7A:
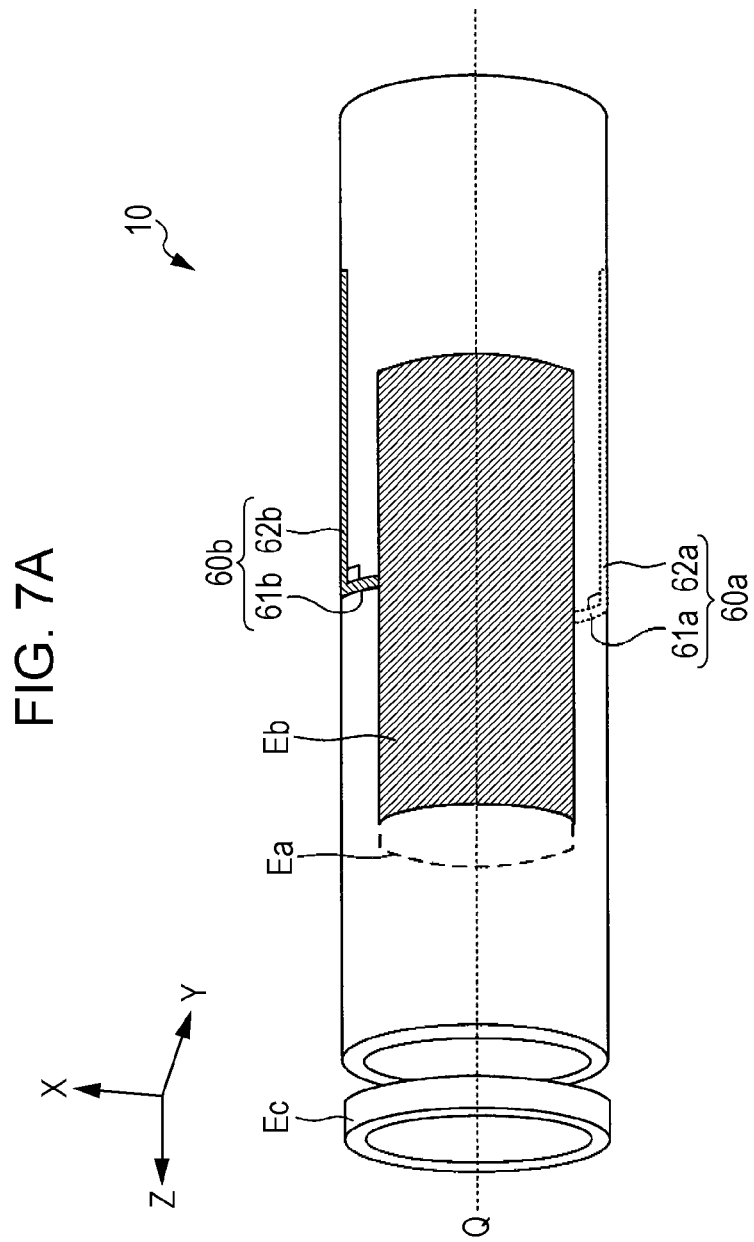
FIG. 7A is a schematic perspective view of a structure of electrodes and electrode-side wiring patterns.

FIGS. 7A and 7B are schematic perspective views of a structure of the electrodes Ea and Eb and the electrode-side wiring patterns 60a and 60b.

As illustrated in FIG. 7A, the electrodes Ea and Eb are formed to have a quadrangular shape (rectangular shape, more specifically). The electrode-side wiring pattern 60a is constituted by a first pattern 61a and a second pattern 62a. Likewise, the electrode-side wiring pattern 60b is constituted by a first pattern 61b and a second pattern 62b.

As illustrated in FIGS. 7A and 7B, the first patterns 61a and 61b extend from positions near the respective centers of one of longer sides of the rectangular electrodes Ea and Eb in a circumference direction of the measurement pipe Pex, respectively. In addition, the second patterns 62a and 62b extend along the central axis Q of the measurement pipe Pex, from ends of the first patterns 61a and 61b opposite to the ends connected to the electrodes Ea and Eb, respectively. That is, the second patterns 62a and 62b are formed to have a right angle with the first patterns 61a and 61b, respectively.

Now, an arrangement of the electrode-side wiring patterns 60a and 60b with respect to the magnetic flux B of the exciting coil Lex will be described.

Figure 8B:
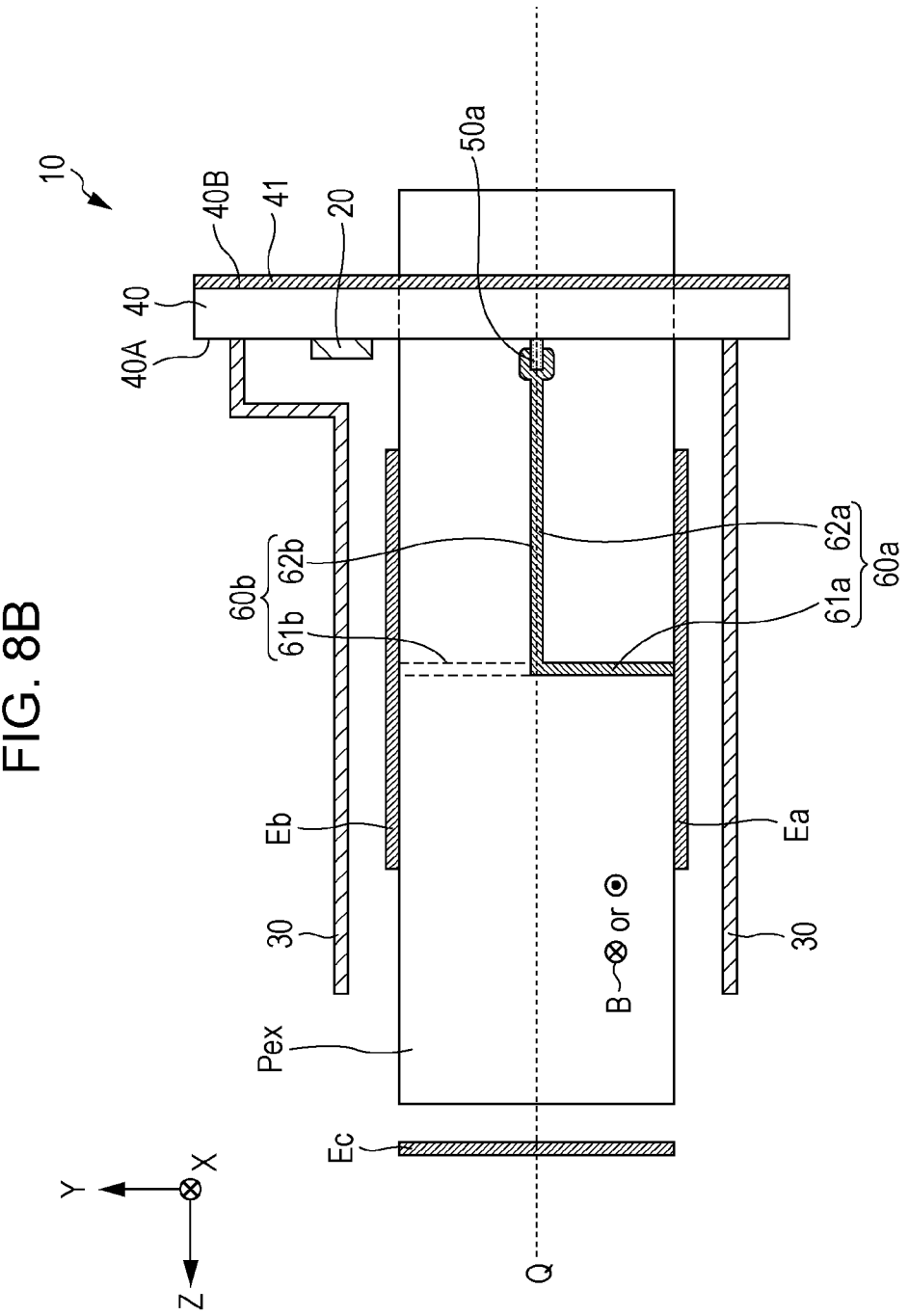
FIG. 8B is a diagram illustrating an arrangement example of the electrode-side wiring patterns with respect to the magnetic flux generated by the exciting coil.

FIGS. 8A and 8B are diagrams each illustrating an arrangement example of the electrode-side wiring patterns 60a and 60b with respect to the magnetic flux B generated by the exciting coil Lex.

As illustrated in FIGS. 8A and 8B, a portion of the electrode-side wiring pattern 60a that extends in the direction of the central axis Q, that is, the second pattern 62a, and a portion of the electrode-side wiring pattern 60b that extends in the direction of the central axis Q, that is, the second pattern 62b, have an overlap in plan view from a direction of the magnetic flux B generated by the exciting coil Lex.

Such a configuration can further reduce the influence of magnetic flux differential noise that is generated when the polarity of the exciting current is switched, on the signals VINa and VINb that propagate through the wirings La and Lb connecting the electrodes Ea and Eb to the preamplifier circuit 21, respectively. This will be described in detail below.

Figure 9:
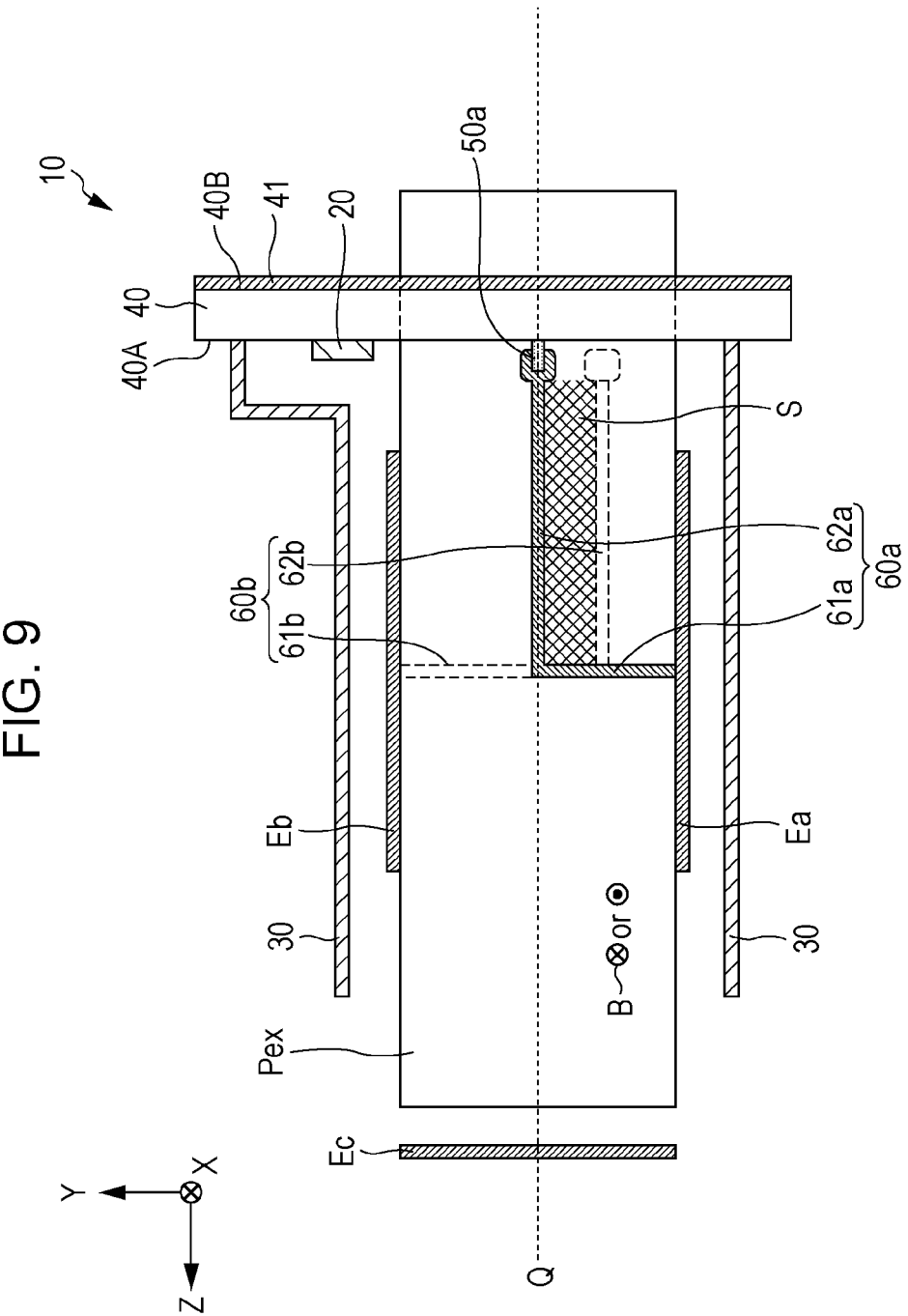
FIG. 9 is a diagram for describing magnetic flux differential noise.

FIG. 9 is a diagram for describing magnetic flux differential noise.

In the electromagnetic flowmeter 10 according to the first embodiment, the electrode Ea, the wiring La, the preamplifier circuit 21, the wiring Lb, the electrode Eb, and the fluid form a loop (coil) of a single turn. If this loop has an area that links to an alternating magnetic flux according to switching of the polarity of the exciting current, magnetic flux differential noise occurs in the loop due to electromagnetic induction based on the alternating magnetic field.

For example, if the second pattern 62a of the wiring La and the second pattern 62b of the wiring Lb are arranged to be shifted from each other in a direction (Y-axis direction) perpendicular to the magnetic flux B as illustrated in FIG. 9, an area S between the second patterns 62a and 62b links to the alternating magnetic field B that is generated when the polarity of the exciting current is switched. Consequently, an electromotive force due to electromagnetic induction occurs in the loop, and the electromotive force serves as magnetic flux differential noise. Since this magnetic flux differential noise is superimposed on the detection signals propagating through the wirings La and Lb (the second patterns 62a and 62b), the magnetic flux differential noise serves as a cause of increasing the time taken for the flow rate signal obtained by amplifying the detection signals to become stable.

Since the time taken for the flow rate signal to become stable increases as the magnetic flux difference noise increases, a publicly known noise countermeasure for suppressing the influence of 1/f noise by decreasing the switching period of the exciting current is not usable. As a result, measurement accuracy and stability of the electromagnetic flowmeter may decrease.

Accordingly, in the electromagnetic flowmeter 10 according to the first embodiment, the second patterns 62a and 62b are formed to overlap in plan view from the direction of the magnetic flux B generated by the exciting coil Lex as illustrated in FIG. 8B.

With such a configuration, since the area S of the loop that links to the alternating magnetic flux B generated when the polarity of the exciting current is switched can be reduced, the magnetic flux difference noise can also be reduced. Consequently, the aforementioned noise countermeasure becomes usable, and a decrease in measurement accuracy and stability can be suppressed.

Advantageous Effects of Electromagnetic Flowmeter According to a First Embodiment As described above, since the preamplifier circuit 21 constitutes a differential amplification circuit, the capacitance-type electromagnetic flowmeter according to the first embodiment of the present disclosure is able to remove common-mode noise and to suppress a decrease in measurement accuracy and stability thereof.

In addition, since the shield case 30 is disposed on the printed circuit board 40 to surround the IC package 20, the wirings La and Lb, and the electrodes Ea and Eb, noise that enters high-impedance lines of the preamplifier circuit 21 from the outside can be suppressed. Consequently, a decrease in accuracy and stability of flow rate measurement can be suppressed.

In addition, since the preamplifier circuit 21 has a circuit configuration in which common-mode signals are not amplified even if a mismatch occurs between resistances of the resistors RF1 and RF2 in the electromagnetic flowmeter 10 according to the first embodiment, the CMRR of the preamplifier circuit 21 can be improved by setting the amplification factor $A_{d1}$ of the preamplifier circuit 21 to be greater than 1.

Therefore, the capacitance-type electromagnetic flowmeter according to the first embodiment of the present disclosure is able to improve accuracy and stability of flow rate measurement compared with capacitance-type electromagnetic flowmeters of the related art.

In addition, since the two operational amplifiers 23 and 24 constituting the preamplifier circuit 21 are sealed in the single IC package 20 in the electromagnetic flowmeter 10 according to the first embodiment, the operational amplifiers 23 and 24 can have matching temperature drift directions in response to a temperature change of a fluid in the measurement pipe as described above. Consequently, a decrease in accuracy and stability of flow rate measurement due to a temperature change can be suppressed.

In addition, by setting the amplification factor $A_{d2}$ of the subtracter circuit 22 to be smaller than the amplification factor $A_{d1}$ of the preamplifier circuit 21, the signal amplification circuit 16 of the electromagnetic flowmeter 10 according to the first embodiment can appropriately amplify differential signal components while suppressing amplification of common-mode signal components even if a mismatch occurs between resistances of the resistors R1 and R2 or between resistances of the resistors R3 and R4 in the subtracter circuit 22.

In particular, by setting the amplification factor $A_{d2}$ of the subtracter circuit 22 to 1, the CMRR of the entire signal amplification circuit 16 can be improved. Consequently, a further improvement in accuracy and stability of flow rate measurement can be expected.

In addition, since the electromagnetic flowmeter 10 according to the first embodiment has a structure in which the measurement pipe Pex is inserted in the through hole 48 penetrating through the printed circuit board 40 from the principal surface 40A on which the IC package 20 is mounted to the opposite principal surface 40B, the pair of electrodes Ea and Eb disposed on the outer circumferential surface of the measurement pipe Pex and the IC package 20 constituting the preamplifier circuit 21 can be arranged in close proximity to each other. With such a configuration, the lengths of the wirings La and Lb having a high impedance can be reduced, and the preamplifier circuit 21 can be more robust against the influence of noise.

In addition, since the shield pattern 41 is disposed on the back surface (principal surface 40B) of the printed circuit board 40, noise entering the preamplifier circuit 21 from the back surface of the printed circuit board 40 can be suppressed. In addition, since this configuration makes the shape of the shield case 30 simpler than in the case of using a box-shaped shield case that surround the entire printed circuit board 40, for example, production cost of the shield case can be reduced.

In addition, by arranging the exciting coils Lex_1 and Lex2 on the outer side of the shield case 30, the preamplifier circuit 21 becomes more robust against the influence of noise from the exciting coils Lex_1 and Lex_2. Consequently, a further improvement in accuracy and stability of flow rate measurement can be expected.

In addition, since portions of the wirings La and Lb that are formed on the outer circumferential surface of the measurement pipe Pex are implemented by the electrode-side wiring patterns 60a and 60b that extend from the electrodes Ea and Eb toward the printed circuit board 40, respectively, in the electromagnetic flowmeter 10 according to the first embodiment, the electrode-side wiring patterns 60a and 60b can be formed by using the same thin film formation technique as that used for the electrodes Ea and Eb. Consequently, production cost can be reduced compared with the case of using shielded cables as in the related art.

In addition, in the electromagnetic flowmeter 10 according to the first embodiment, the electrode-side wiring patterns 60a and 60b disposed on the measurement pipe Pex and the preamplifier-side wiring patterns 42a and 42b disposed on the printed circuit board 40 are connected to each other by the jumper wires 50a and 50b, respectively. Thus, assembling work becomes easier than in the case of using shielded cables as in the related art, and production cost can be reduced.

Further, in the electromagnetic flowmeter 10 according to the first embodiment, the preamplifier-side wiring pattern 42a and the preamplifier-side wiring pattern 42b are formed to be symmetric with respect to the line R that links the electrodes Ea and Eb and the central axis Q of the measurement pipe Pex in plan view from the Z-axis direction. Therefore, even if noise enters the preamplifier-side wiring patterns 42a and 42b, the noise entering the preamplifier-side wiring patterns 42a and 42b can be handled as common-mode noise instead of differential noise, and consequently such noise can be appropriately removed by the preamplifier circuit at the subsequent stage.

In addition, in the electromagnetic flowmeter 10 according to the first embodiment, since the portion (the second pattern 62a) of the electrode-side wiring pattern 60a that extends in the direction of the axis of the measurement pipe Pex on the outer circumferential surface of the measurement pipe Pex and the portion (the second pattern 62b) of the electrode-side wiring pattern 60b that extends in the direction of the axis of the measurement pipe Pex have an overlap in plan view from a direction of the magnetic flux B generated by the exciting coils Lex_1 and Lex_2, an area of the loop that links to the alternating magnetic flux generated when the polarity of the exciting current is switched can be reduced. Since the influence of magnetic flux differential noise generated when the polarity of the exciting current is switched can be reduced consequently, a decrease in measurement accuracy and stability can be further suppressed by using a publicly known noise countermeasure mentioned above.

Second Embodiment

Configuration of Electromagnetic Flowmeter According to a Second Embodiment

Figure 10:
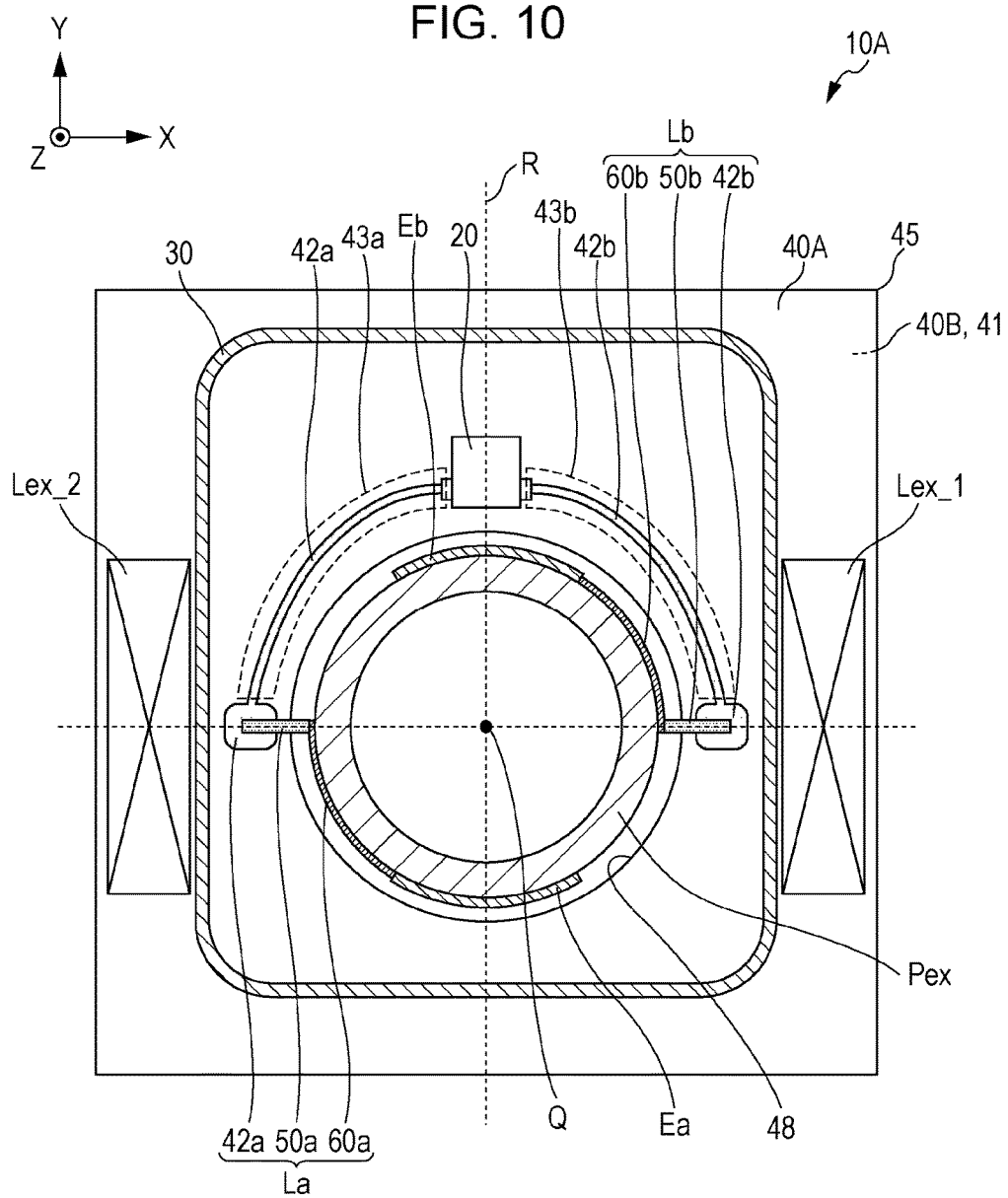
FIG. 10 is a schematic front view of a structure around a detection unit of an electromagnetic flowmeter according to a second embodiment.

FIG. 10 is a schematic top view of a structure around the detection unit 13 of an electromagnetic flowmeter 10A according to a second embodiment.

As illustrated in FIG. 10, the electromagnetic flowmeter 10A according to the second embodiment differs from the electromagnetic flowmeter 10 according to the first embodiment in that guard patterns 43a and 43b are disposed between the preamplifier-side wiring patterns 42a and 42b and the shield pattern 41 on a printed circuit board 45. The rest of the configuration of the electromagnetic flowmeter 10A is substantially the same as that of the electromagnetic flowmeter 10 according to the first embodiment.

Figure 11A:
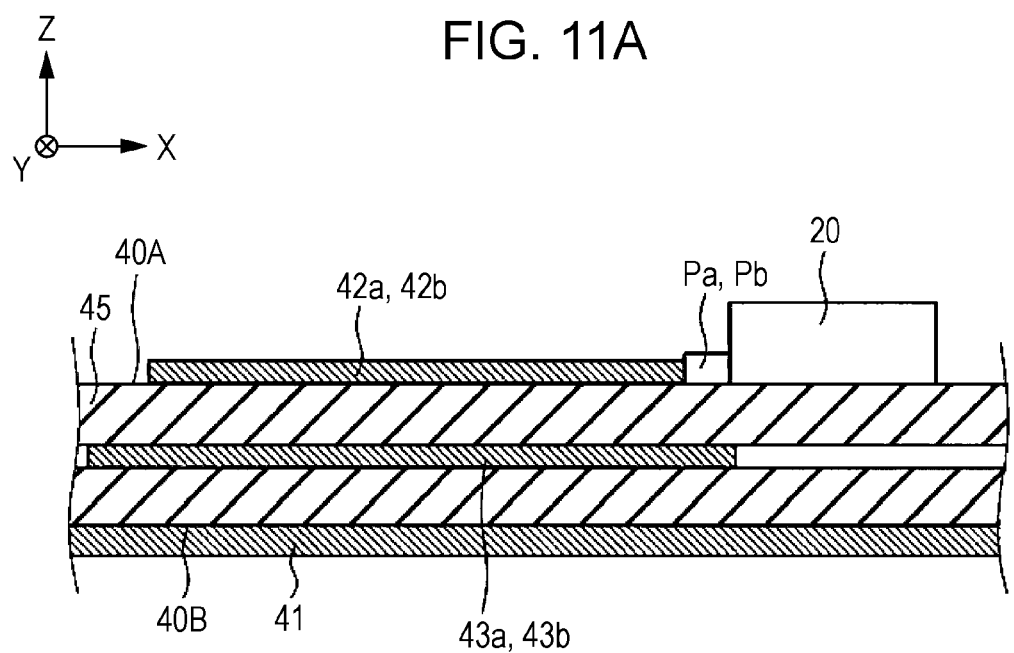
FIG. 11A is a diagram schematically illustrating a cross-sectional structure of a printed circuit board of the electromagnetic flowmeter according to the second embodiment.

FIG. 11A is a diagram schematically illustrating a cross-sectional structure of the printed circuit board 45 of the electromagnetic flowmeter 10A according to the second embodiment.

As illustrated in FIG. 11A, the printed circuit board 45 is a multilayer board having a plurality of wiring layers. The shield pattern (solid pattern) 41 connected to the ground potential $V_{COM}$ is disposed on the principal surface 40B of the printed circuit board 45. The preamplifier-side wiring patterns 42a and 42b respectively constituting the wirings La and Lb are disposed on the principal surface 40A of the printed circuit board 45. The guard patterns 43a and 43b are disposed on a wiring layer located between the principal surfaces 40A and 40B.

As illustrated in FIGS. 10 and 11A, the guard pattern 43a has an overlap with the preamplifier-side wiring pattern 42a in plan view from the Z-axis direction. The guard pattern 43b has an overlap with the preamplifier-side wiring pattern 42b in plan view from the Z-axis direction.

The guard patterns having a potential equal to the potential of the inverting input terminals of the operational amplifiers of the preamplifier circuit are disposed between the preamplifier-side wiring patterns and the shield pattern. Thus, attenuation of signal levels of signals detected by the electrodes due to parasitic capacitances formed between the preamplifier-side wiring patterns and the shield pattern can be suppressed.

Figure 11B:
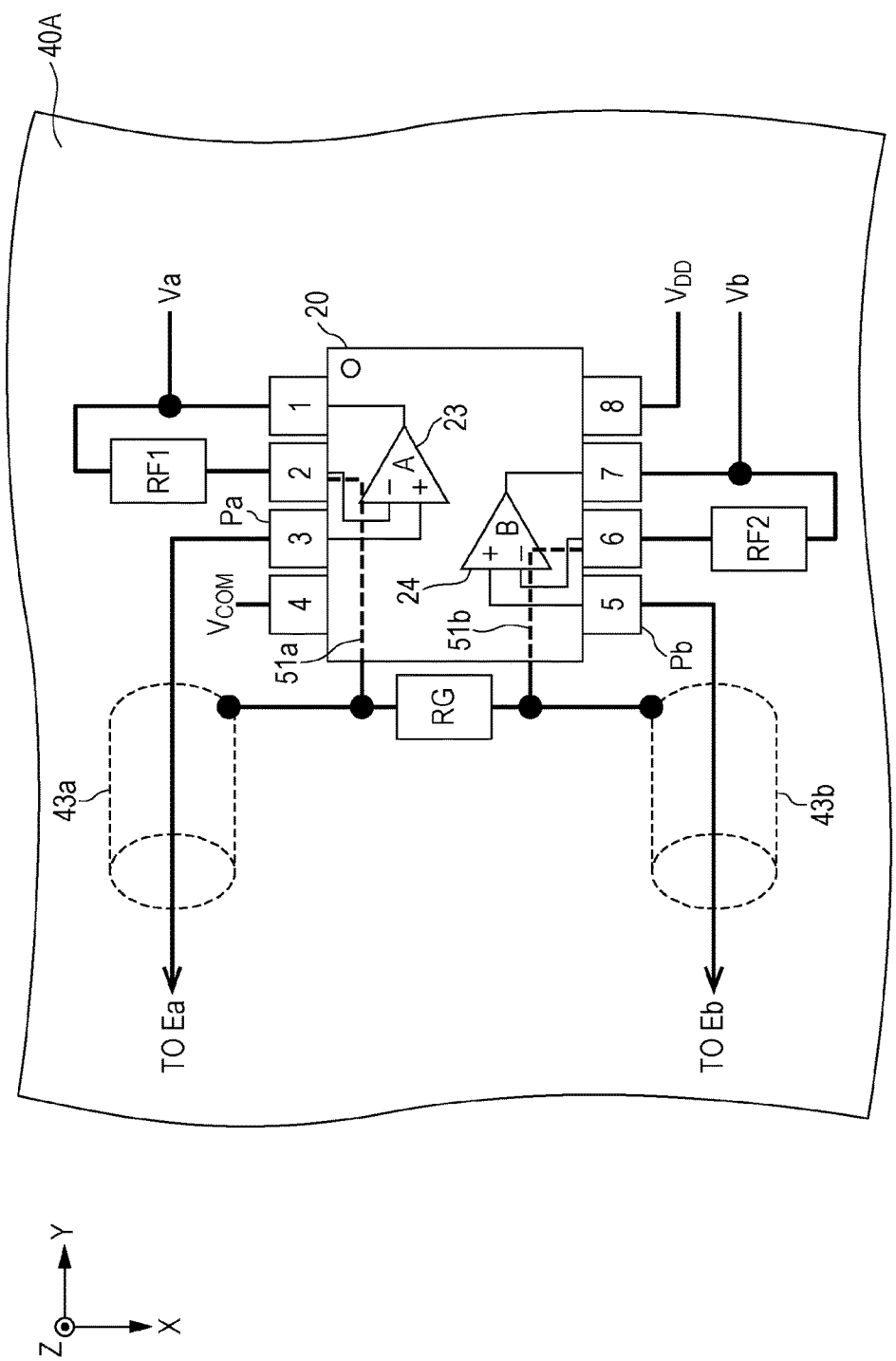
FIG. 11B is a diagram illustrating an arrangement example of components constituting a preamplifier circuit of the electromagnetic flowmeter according to the second embodiment on the printed circuit board.

FIG. 11B is a diagram illustrating an arrangement example of the components constituting the preamplifier circuit 21 on the printed circuit board 45. FIG. 11B schematically illustrates an arrangement of the components constituting the preamplifier circuit 21 when the principal surface 40A of the printed circuit board 40 is viewed from the Z-axis direction.

As illustrated in FIG. 11B, connections between the resistor RG and the inverting input terminals (−) of the operational amplifiers 23 and 24 can be implemented by forming the wiring patterns 51a and 51b right under the IC package 20 on the principal surface 40A of the printed circuit board 40.

Since such a configuration eliminates the necessity of forming signal transmitting wiring patterns on the principal surface (back surface) 40B of the printed circuit board 45, allowing formation of the shield pattern (solid pattern) 41 connected to the ground potential $V_{COM}$ all over the principal surface 40B.

Figure 12:
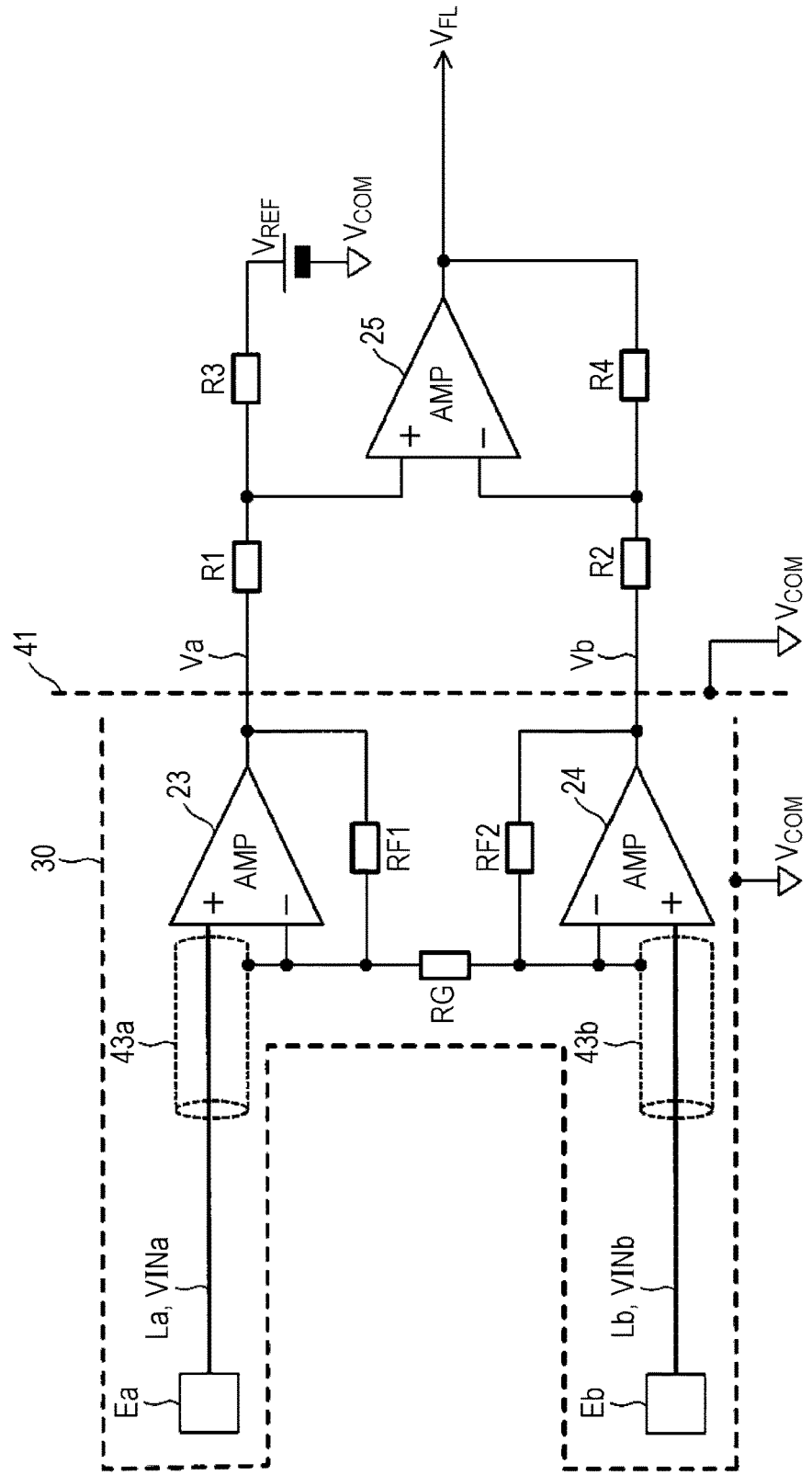
FIG. 12 is a diagram schematically illustrating a shielded range of a signal amplification circuit of the electromagnetic flowmeter according to the second embodiment.

In addition, as illustrated in FIGS. 11B and 12, the guard pattern 43a has a potential equal to that of the inverting input terminal (−) of the operational amplifier 23, and the guard pattern 43b has a potential equal to that of the inverting input terminal (−) of the operational amplifier 24.

With such a configuration, attenuation of signals propagating through the preamplifier-side wiring patterns 42a and 42b due to parasitic capacitances formed between the shield pattern 41 and the preamplifier-side wiring patterns 42a and 42b, respectively, can be suppressed.

Now, output impedances of the guard patterns 43a and 43b are described.

Each of the guard patterns 43a and 43b has an output impedance based on a combined resistance of resistances of the resistors RF1, RF2, and RG. It is desirable that the output impedances of the guard patterns 43a and 43b are minimized; however, there would be no problem if the output impedance is set to a value that is sufficiently smaller than the impedance based on a parasitic capacitance formed between the preamplifier-side wiring pattern and the shield pattern.

For example, an interlayer capacitance of a printed circuit board is typically equal to 10 pF/cm². If it is assumed that a parasitic capacitance Cp between the preamplifier-side wiring pattern 42a (42b) and the shield pattern 41 is equal to 10 pF and a frequency fs of the signal input to the preamplifier circuit 21 through the preamplifier-side wiring pattern 42a (42b) is equal to 100 Hz, an impedance Zp based on the parasitic capacitance Cp is denoted by Equation (3).

$$Zp = \frac{1}{2 \times \pi \times fs \times Cp} = 159 \text{ M}\Omega \qquad (3)$$

Therefore, in this case, the resistances of the resistors RF1, RF2, and RG are set so that the output impedance of the guard pattern 43a (43b) becomes smaller than, for example, 0.01% of the impedance Zp based on the parasitic capacitance Cp, that is, smaller than 15.9 kΩ. Such a configuration eliminates or minimizes a possibility of the signal level of the signal detected by the electrode attenuating due to the impedance Zp based on the parasitic capacitance Cp.

Note that the amplification factor $A_{a1}$ of the preamplifier circuit 21 may be set to a desired value based on Equation (1) while this condition is met.

As described above, in the electromagnetic flowmeter 10A according to the second embodiment, the guard patterns 43a and 43b having potentials equal to potentials of the inverting input terminals (−) of the operational amplifiers 23 and 24 of the preamplifier circuit 21 are formed between the shield pattern 41 and the preamplifier-side wiring patterns 42a and 42b, respectively. Therefore, attenuation of signals propagating through the preamplifier-side wiring patterns 42a and 42b due to parasitic capacitances formed between the shield pattern 41 and the preamplifier-side wiring patterns 42a and 42b can be suppressed. Consequently, even if the lengths of the preamplifier-side wiring patterns 42a and 42b are long, attenuation of the signals detected by the electrodes Ea and Eb can be suppressed, and a decrease in measurement accuracy and stability can be suppressed.

Third Embodiment

Configuration of Electromagnetic Flowmeter According to a Third Embodiment

Figure 13:
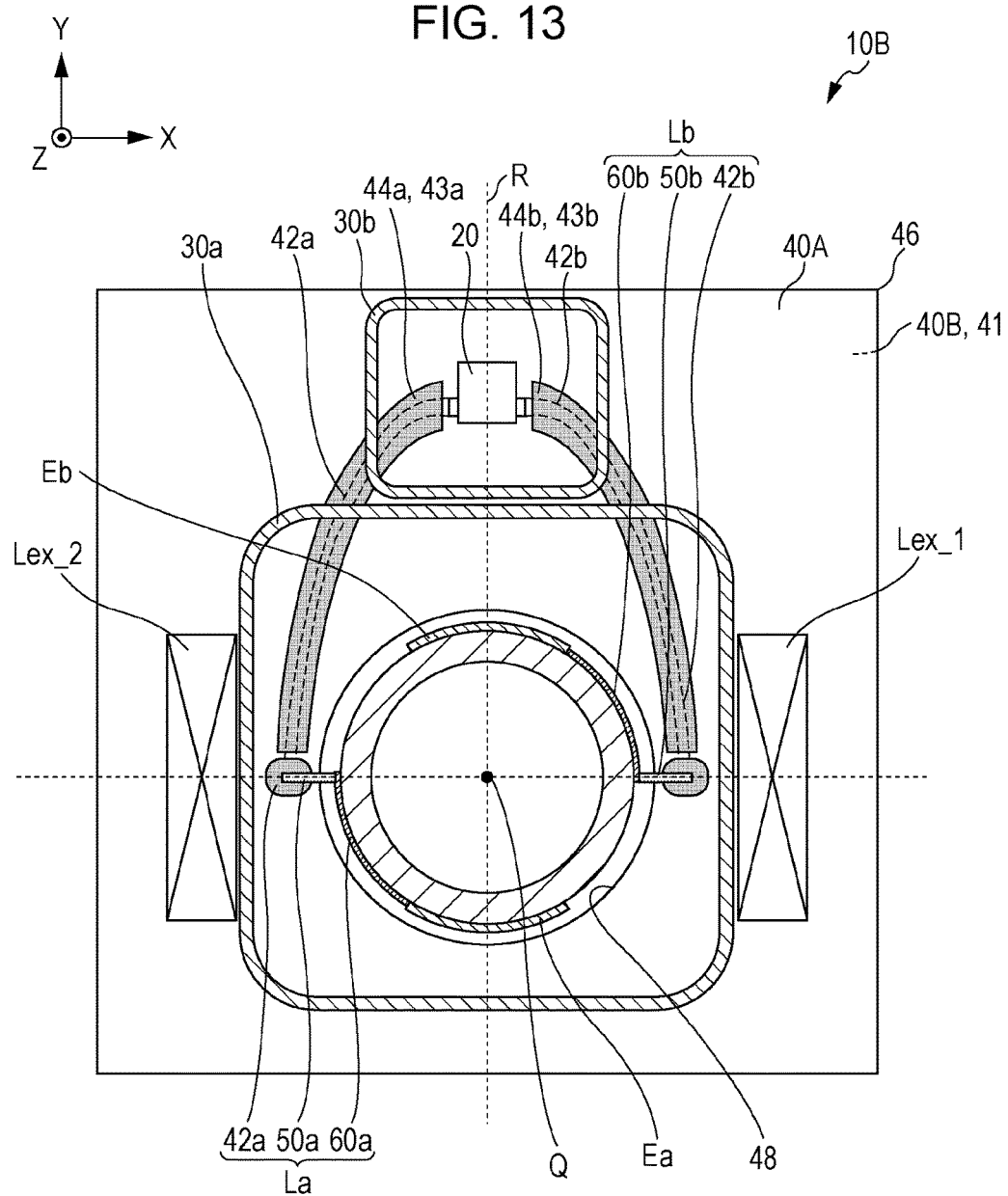
FIG. 13 is a schematic front view of a structure around a detection unit of an electromagnetic flowmeter according to a third embodiment.
Figure 14:
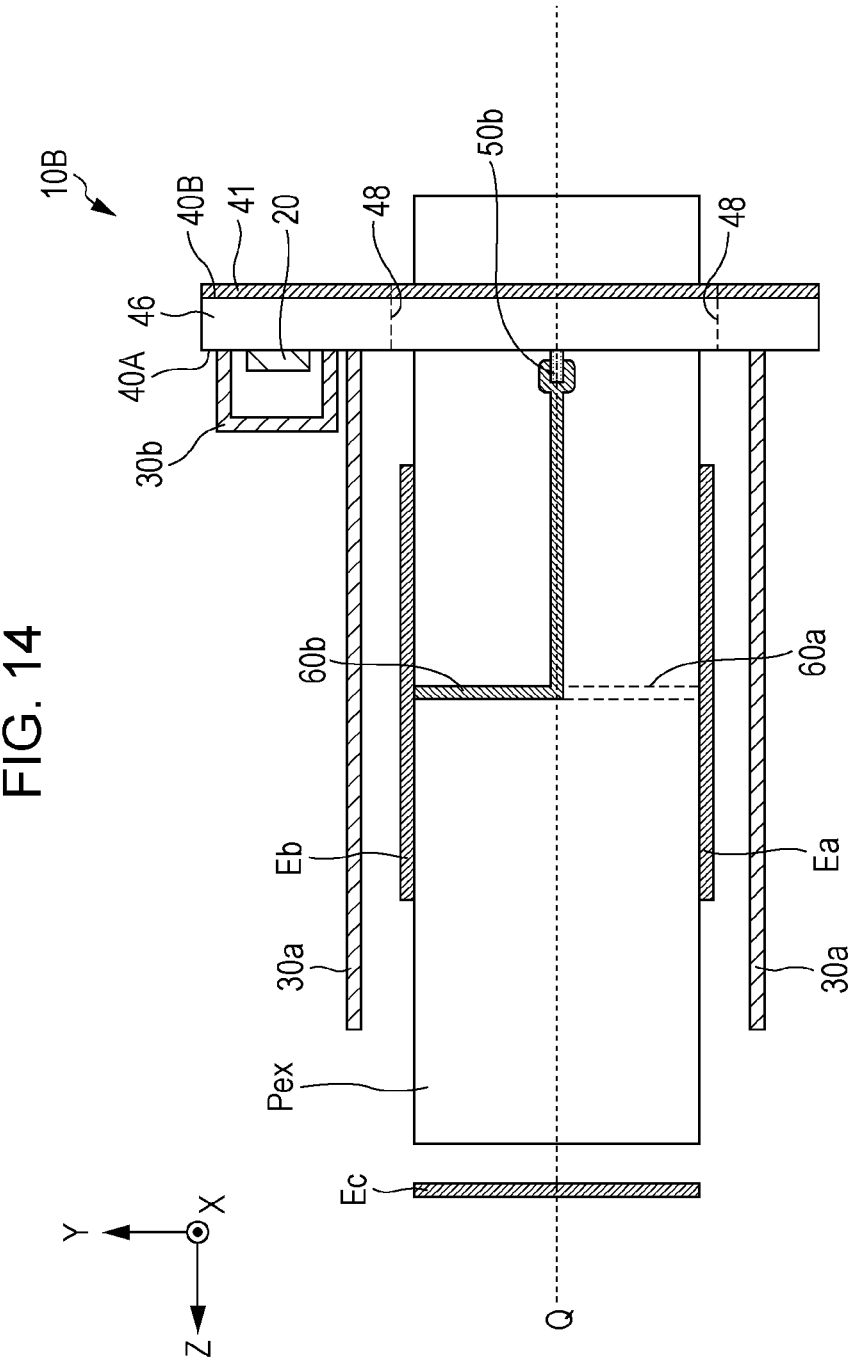
FIG. 14 is a schematic side view of the structure around the detection unit of the electromagnetic flowmeter according to the third embodiment.

FIG. 13 is a schematic top view of a structure around the detection unit 13 of an electromagnetic flowmeter 10B according to a third embodiment. FIG. 14 is a schematic side view of the structure around the detection unit 13 of the electromagnetic flowmeter 10B according to the third embodiment.

As illustrated in FIG. 13, the electromagnetic flowmeter 10B according to the third embodiment differs from the electromagnetic flowmeter 10B according to the second embodiment in that the preamplifier-side wiring patterns 42a and 42b are interposed between the guard patterns 43a and 43b and guard patterns 44a and 44b, respectively, in a stacking direction of a printed circuit board 46, and the shield case 30 is constituted by two cases. The rest of the configuration of the electromagnetic flowmeter 10B is substantially the same as that of the electromagnetic flowmeter 10A according to the second embodiment.

Figure 15:
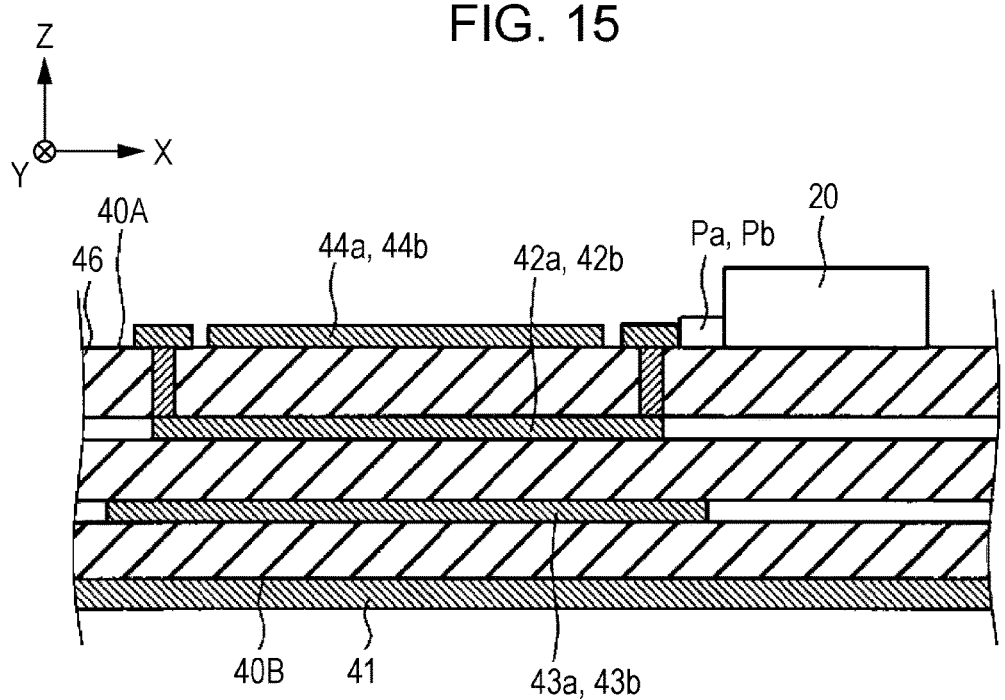
FIG. 15 is a diagram schematically illustrating a cross-sectional structure of a printed circuit board of the electromagnetic flowmeter according to the third embodiment.

FIG. 15 is a diagram schematically illustrating a cross-sectional structure of the printed circuit board 46 of the electromagnetic flowmeter 10B according to the third embodiment.

As illustrated in FIG. 15, the printed circuit board 46 is a multilayer board having a plurality of wiring layers. The shield pattern (solid pattern) 41 connected to the ground potential $V_{COM}$ is disposed on the principal surface 40B of the printed circuit board 46. The guard patterns 44a and 44b are disposed on the principal surface 40A of the printed circuit board 46. The preamplifier-side wiring patterns 42a and 42b respectively constituting the wirings La and Lb are disposed on a wiring layer located between the principal surface 40A and the principal surface 40B. The guard patterns 43a and 43b are disposed on a wiring layer located between the principal surface 40B and the wiring layer on which the preamplifier-side wiring patterns 42a and 42b are disposed.

As illustrated in FIG. 13, the guard pattern 44a has an overlap with the preamplifier-side wiring pattern 42a in plan view from the Z-axis direction, just like the guard pattern 43a. The guard pattern 44b has an overlap with the preamplifier-side wiring pattern 42b in plan view from the Z-axis direction, just like the guard pattern 43b.

That is, as illustrated in FIG. 15, the preamplifier-side wiring pattern 42a is formed to be interposed between the guard pattern 43a and the guard pattern 44a in the stacking direction of the printed circuit board 46. The preamplifier-side wiring pattern 42b is formed to be interposed between the guard pattern 43b and the guard pattern 44b in the staking direction of the printed circuit board 46.

In addition, the guard pattern 44a has a potential equal to the potential of the inverting input terminal (−) of the operational amplifier 23, just like the guard pattern 43a. The guard pattern 44b has a potential equal to the potential of the inverting input terminal (−) of the operational amplifier 24, just like the guard pattern 43b.

By placing each preamplifier-side wiring pattern between the two guard patterns in this way, attenuation of the signal propagating through the preamplifier-side wiring pattern due to parasitic capacitance formed between the preamplifier-side wiring pattern and the shield pattern can be further suppressed, as in the above-described electromagnetic flowmeter 10A according to the second embodiment.

In addition, as illustrated in FIGS. 13 and 14, the electromagnetic flowmeter 10B according to the third embodiment includes a case 30a and a case 30b, which are composed of a conductive material, as the shield case 30 for preventing noise from entering the preamplifier circuit 21.

The conductive material used for the cases 30a and 30b may be the same as the conductive material used for the shield case 30 of the electromagnetic flowmeter 10 according to the first embodiment, for example.

As illustrated in FIGS. 13 and 14, the case 30a is perpendicularly disposed on the outer side of the through hole 48 on the principal surface 40A of the printed circuit board 46 so as to surround the measurement pipe Pex, the electrodes Ea and Eb, the electrode-side wiring patterns 60a and 60b, and the jumper wires 50a and 50b. On the other hand, the case 30b is perpendicularly disposed on the principal surface 40A of the printed circuit board 46 so as to surround the IC package 20.

Since the cases 30a and 30b are disposed between the IC package 20 and the measurement pipe Pex in this configuration, the operational amplifiers 23 and 24 can be spaced apart from the measurement pipe Pex further and the operational amplifiers 23 and 24 and the measurement pipe Pex can be arranged to be spatially separated. Thus, the influence of temperature on the operational amplifiers 23 and 24 from a fluid flowing in the measurement pipe Pex can be further reduced.

In addition, by dividing the shield case into the two cases 30a and 30b, the shapes of the individual cases 30a and 30b can be made simple. For example, since pieces obtained by cutting an available metal pipe into an appropriate length can be used as the cases 30a and 30b, production cost of the shield case can be further reduced.

Extensions of Embodiments

While the prevent disclosure made by the inventor has been described specifically based on the embodiments above, it is needless to say that the present disclosure is not limited to those embodiments and various modifications can be made within the scope not departing from the essence of the present disclosure.

Figure 16:
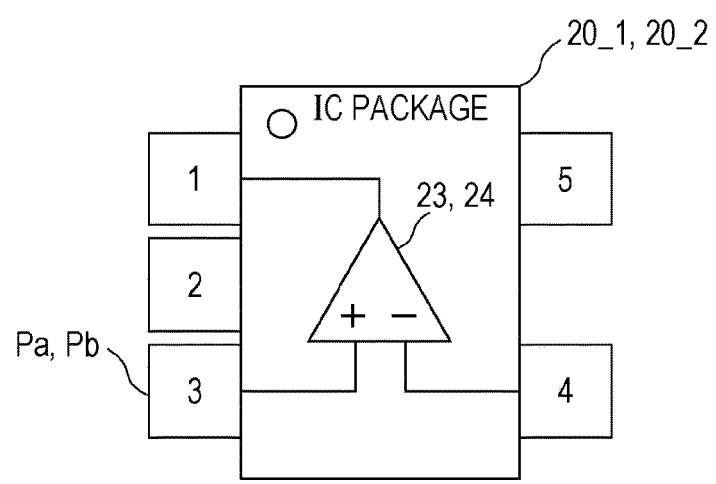
FIG. 16 is a diagram schematically illustrating a configuration of an IC package of a single operational amplification IC.

For example, in the embodiments described above, the case where the operational amplifiers 23 and 24 are sealed in the single IC package 20 has been described as an example; however, the configuration is not limited to this one. For example, the operational amplifiers 23 and 24 may be separately packaged into IC packages (single operational amplifier ICs) 20_1 and 20_2 as illustrated in FIG. 16.

In this case, the two single operational amplifier ICs 20_1 and 20_2 (the operational amplifiers 23 and 24) may be disposed in close proximity to each other on the printed circuit board 40 (or 45 or 46). Specifically, the single operational amplifier ICs 20_1 and 20_2 may be disposed in close proximity to each other so that the difference in the influence of temperature which the operational amplifiers 23 and 24 receive from the fluid flowing in the measurement pipe Pex (a difference in temperature drift of the operational amplifiers 23 and 24) is ignorable. A specific example is shown below.

Figure 17:
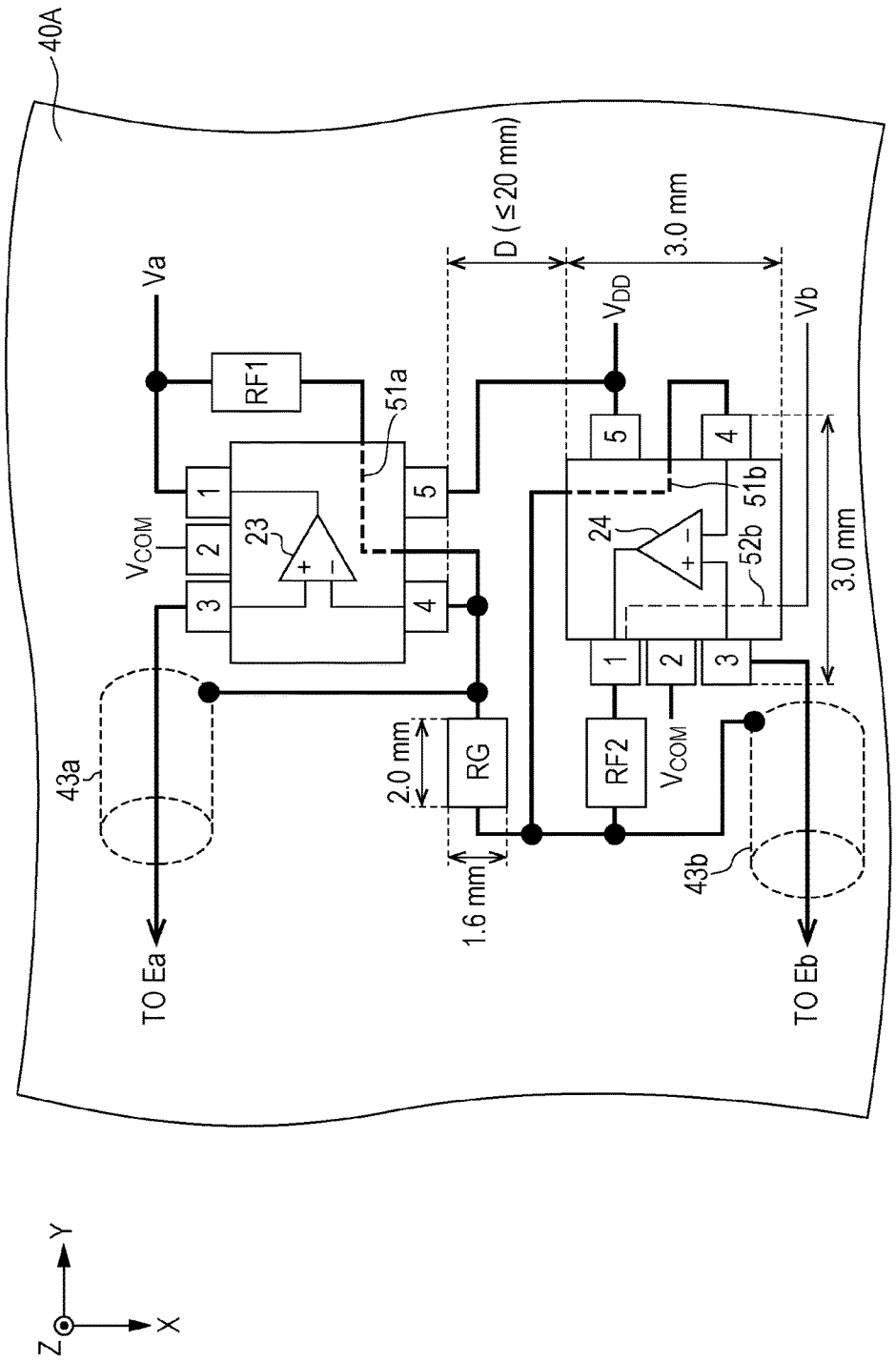
FIG. 17 is a diagram illustrating an arrangement example of components constituting a preamplifier circuit on the printed circuit board in the case where single operational amplifier ICs are used as operational amplifiers.

FIG. 17 is a diagram illustrating an arrangement example of components constituting the preamplifier circuit 21 on the printed circuit board in the case where single operational amplifier ICs are used as the operational amplifiers 23 and 24.

In the case where the single operational amplifier ICs 20_1 and 20_2, which are discrete ICs, are used as the operational amplifiers 23 and 24, respectively, the single operational amplifier ICs 20_1 and 20_2 are preferably arranged to be as close as possible on the principal surface 40A of the printed circuit board 40 (or 45 or 46) as illustrated in FIG. 17. For example, in the case where the dimensions of the each single operational amplifier IC including terminals (pins) thereof are approximately 3.0 mm×3.0 mm and the dimensions of each of the resistors RF1, RF2, and RG are approximately 1.6 mm×2.0 mm in plan view from the Z-axis direction, a distance D between the single operational amplifier ICs 20_1 and 20_2 is preferably set to be less than or equal to 20 mm. Note that the single operational amplifier ICs 20_1 and 20_2 need to be not in contact with each other.

In addition, as illustrated in FIG. 17, connections between the resistor RG and the inverting input terminals (−) of the operational amplifiers 23 and 24 can be implemented by forming the wiring patterns 51a and 51b right under the IC packages 20_1 and 20_2 on the principal surface 40A of the printed circuit board 40, respectively. Likewise, a wiring extending from the output terminal Vb of the operational amplifier 24 can be implemented by forming a wiring pattern 52b right under the IC package 20_2 on the principal surface 40A of the printed circuit board 40.

In addition, the description has been given in the embodiments on the assumption that the preamplifier circuit 21 and the subtracter circuit 22 are mounted on different printed circuit boards; however, if the influence of temperature is ignorable, some or all of the circuit components (the operational amplifier 25 and the resistors R1 to R4) of the subtracter circuit 22 at the subsequent stage as well as the preamplifier circuit 21 may be mounted on a single printed circuit board.

Further, in the embodiments described above, the case where the signal amplification circuit 16 is a two-stage amplification circuit including the preamplifier circuit 21 and the subtracter circuit 22 has been shown as an example; however, the configuration is not limited to this one. For example, the signal amplification circuit 16 may be a single-stage amplification circuit not including the subtracter circuit 22.

In addition, the description above is given of the case where the structures of the signal amplification circuit 16 and the detection unit 13 according to each embodiment are used in capacitance-type electromagnetic flowmeters as an example; however, the structures of the signal amplification circuit 16 and the detection unit 13 according to each embodiment can be similarly used in fluid-contact-type electromagnetic flowmeters.

What is claimed is:

1. An electromagnetic flowmeter comprising:
    a measurement pipe in which a fluid subjected to detection flows;
    an exciting coil disposed on an outer side of the measurement pipe, the exciting coil generating a magnetic field according to a current supplied thereto;
    a pair of a first electrode and a second electrode disposed on an outer circumferential surface of the measurement pipe so as to face each other in a direction perpendicular to the magnetic field generated by the exciting coil;
    a preamplifier circuit that amplifies an electromotive force generated between the first electrode and the second electrode;
    a board on which the preamplifier circuit is mounted;
    a shield case disposed on the board; and
    a data processing control circuit that calculates a flow rate of the fluid in accordance with a signal resulting from the amplification performed by the preamplifier circuit,
    wherein the preamplifier circuit includes
        a first operational amplifier,
        a second operational amplifier,
        a first wiring connecting the first electrode and a non-inverting input terminal of the first operational amplifier to each other,
        a second wiring connecting the second electrode and a non-inverting input terminal of the second operational amplifier,
        a first resistor connected between an output terminal of the first operational amplifier and an inverting input terminal of the first operational amplifier,
        a second resistor connected between an output terminal of the second operational amplifier and an inverting input terminal of the second operational amplifier, and
        a third resistor connected between the inverting input terminal of the first operational amplifier and the inverting input terminal of the second operational amplifier,
    wherein the preamplifier circuit has an amplification factor greater than 1, and
    wherein the shield case is disposed on the board so as to surround the first operational amplifier, the second operational amplifier, the first wiring, the second wiring, the first electrode, and the second electrode.

2. The electromagnetic flowmeter according to claim 1, wherein the first operational amplifier and the second operational amplifier are disposed on the board in close proximity to each other.

3. The electromagnetic flowmeter according to claim 1, wherein the first operational amplifier and the second operational amplifier are sealed in a single integrated circuit package.

4. The electromagnetic flowmeter according to claim 1, further comprising:
    a subtracter circuit that generates a signal based on a result of subtraction of a signal output from the first operational amplifier and a signal output from the second operational amplifier,
    wherein the data processing control circuit calculates the flow rate of the fluid in accordance with the signal based on the result of the subtraction,
    wherein the subtracter circuit includes
        a third operational amplifier,
        a fourth resistor connected between the output terminal of the first operational amplifier and a non-inverting input terminal of the third operational amplifier,
        a fifth resistor connected between the output terminal of the second operational amplifier and an inverting input terminal of the third operational amplifier,
        a sixth resistor having one end supplied with a reference voltage and another end connected to the non-inverting input terminal of the third operational amplifier, and
        a seventh resistor connected between the inverting input terminal of the third operational amplifier and an output terminal of the third operational amplifier,
    wherein the subtracter circuit has an amplification factor smaller than the amplification factor of the preamplifier circuit.

5. The electromagnetic flowmeter according to claim 4, wherein the amplification factor of the subtracter circuit is equal to 1.

6. The electromagnetic flowmeter according to claim 1, wherein the board has
    a first principal surface on which the first operational amplifier and the second operational amplifier are mounted,
    a second principal surface opposite to the first principal surface,
    a shield pattern disposed on the second principal surface, connected to a fixed potential, and composed of a metal, and
    a through hole penetrating through the board from the first principal surface to the second principal surface,
    wherein the measurement pipe is inserted in the through hole,
    wherein the shield case is disposed on the first principal surface so as to surround the measurement pipe, and
    wherein the exciting coil is disposed on an outer side of the shield case.

7. The electromagnetic flowmeter according to claim 6, wherein the shield case includes
    a first case disposed on the first principal surface so as to surround the measurement pipe, the first electrode, and the second electrode, the first case being composed of a conductive material, and
    a second case disposed on the first principal surface so as to surround the first operational amplifier and the second operational amplifier, the second case being composed of a conductive material.

8. The electromagnetic flowmeter according to claim 6, wherein the first wiring includes
- a first electrode-side wiring pattern disposed on the outer circumferential surface of the measurement pipe so as to extend from the first electrode toward the board, the first electrode-side wiring pattern being composed of a metal,
- a first preamplifier-side wiring pattern disposed on the board and composed of a metal, and
- a first jumper wire connecting the first electrode-side wiring pattern and the first preamplifier-side wiring pattern to each other, the first jumper wire having a length that is less than wire lengths of the first electrode-side wiring pattern and the first preamplifier-side wiring pattern, and wherein the second wiring includes
- a second electrode-side wiring pattern disposed on the outer circumferential surface of the measurement pipe so as to extend from the second electrode toward the board, the second electrode-side wiring pattern being composed of a metal,
- a second preamplifier-side wiring pattern disposed on the board and composed of a metal, and
- a second jumper wire connecting the second electrode-side wiring pattern and the second preamplifier-side wiring pattern to each other, the second jumper wire having a length that is less than wire lengths of the second electrode-side wiring pattern and the second preamplifier-side wiring pattern.

9. The electromagnetic flowmeter according to claim 8, wherein the first preamplifier-side wiring pattern and the second preamplifier-side wiring pattern are disposed on the board so as to be symmetric with respect to a line linking the first electrode, the second electrode, and an axis of the measurement pipe in plan view.

10. The electromagnetic flowmeter according to claim 8, wherein the board is a multilayer board,
wherein the board has a first guard pattern and a second guard pattern disposed on a wiring layer of the board located between the second principal surface on which the shield pattern is disposed and a wiring layer on which the first preamplifier-side wiring pattern and the second preamplifier-side wiring pattern are disposed, the first guard pattern and the second guard pattern being composed of a metal,
wherein the first guard pattern has an overlap with the first preamplifier-side wiring pattern in plan view and is connected to the inverting input terminal of the first operational amplifier, and
wherein the second guard pattern has an overlap with the second preamplifier-side wiring pattern in plan view and is connected to the inverting input terminal of the second operational amplifier.

11. The electromagnetic flowmeter according to claim 10, wherein the board further has a third guard pattern and a fourth guard pattern disposed on the first principal surface of the board, the third guard pattern and the fourth guard pattern being composed of a metal,
wherein the first preamplifier-side wiring pattern and the second preamplifier-side wiring pattern are disposed on the wiring layer of the board located between the first principal surface and the wiring layer on which the first guard pattern and the second guard pattern are disposed,
wherein the third guard pattern has an overlap with the first preamplifier-side wiring pattern in plan view and is connected to the inverting input terminal of the first operational amplifier, and
wherein the fourth guard pattern has an overlap with the second preamplifier-side wiring pattern in plan view and is connected to the inverting input terminal of the second operational amplifier.

12. The electromagnetic flowmeter according to claim 8, wherein a portion of the first electrode-side wiring pattern that extends in a direction of an axis of the measurement pipe on the outer circumferential surface of the measurement pipe has an overlap with a portion of the second electrode-side wiring pattern that extends in the direction of the axis of the measurement pipe in plan view from a direction of a magnetic flux generated by the exciting coil.

\* \* \* \* \*